(12) United States Patent
Peretz Ben-Asher

(10) Patent No.: US 12,162,650 B2
(45) Date of Patent: Dec. 10, 2024

(54) SEALED STORAGE BOX WITH PUSH CLOSURE

(71) Applicant: Michael Peretz Ben-Asher, Tel Aviv (IL)

(72) Inventor: Michael Peretz Ben-Asher, Tel Aviv (IL)

( * ) Notice: Subject to any disclaimer, the term of this patent is extended or adjusted under 35 U.S.C. 154(b) by 43 days.

(21) Appl. No.: 18/106,496

(22) Filed: Feb. 7, 2023

(65) Prior Publication Data

US 2024/0174409 A1    May 30, 2024

Related U.S. Application Data

(60) Provisional application No. 63/428,489, filed on Nov. 29, 2022.

(51) Int. Cl.
*B65D 43/02* (2006.01)
*A47J 47/02* (2006.01)
(Continued)

(52) U.S. Cl.
CPC .. *B65D 43/022* (2013.01); *B65D 2543/00101* (2013.01); *B65D 2543/00231* (2013.01);
(Continued)

(58) Field of Classification Search
CPC ...... B65D 1/02; B65D 1/0207; B65D 1/0223; B65D 1/023; B65D 1/0246; B65D 1/06; B65D 1/12; B65D 1/165; B65D 1/22; B65D 1/225; B65D 1/26; B65D 1/265; B65D 1/28; B65D 1/32; B65D 1/34; B65D 1/36; B65D 1/40; B65D 1/46; B65D 11/1833; B65D 11/1873; B65D 15/08; B65D 17/00; B65D 17/28; B65D 17/401; B65D 17/4012; B65D 17/4014; B65D 17/506; B65D 17/521; B65D 19/18; B65D 21/0209; B65D 21/0212; B65D 21/0217; B65D 21/0219;
(Continued)

(56) References Cited

U.S. PATENT DOCUMENTS

| | | | | |
|---|---|---|---|---|
| 2010/0282748 A1* | 11/2010 | Lu | ......................... | B65D 43/022 220/260 |
| 2013/0240532 A1* | 9/2013 | Lu | ......................... | B65D 39/12 220/378 |
| 2016/0107805 A1* | 4/2016 | Luo | ......................... | A47J 47/02 220/256.1 |

FOREIGN PATENT DOCUMENTS

| | | | | |
|---|---|---|---|---|
| AU | 2016102068 A4 * | 1/2017 | .............. | A47J 47/02 |
| CN | 204310203 U * | 5/2015 | .............. | A47J 47/02 |

(Continued)

*Primary Examiner* — Anthony D Stashick
*Assistant Examiner* — Marcos Javier Rodriguez Molina

(57) ABSTRACT

A storage box that includes a container, a lid and a circular seal. The lid includes a bottom part, a top part, a bottom cog-wheel part with sloping teeth, a spring, a snap part with stopping members, two lever bodies, a top cog-wheel with sloping pushing teeth, and a push button handle. The bottom part includes an indent for containing the spring and oriented holes for the snap part snaps. The top part includes the top button handle, the top cog-wheel part, the two lever bodies, and the bottom cog-wheel. The spring is positioned inside the indentation, the top part is assembled on the bottom part, the bottom cog-wheel is connected to the top cog-wheel in a way that enables a rotational movement between them and disables a relative vertical movement. The lid is in a retracted close position or in an extended open position.

1 Claim, 22 Drawing Sheets

(51) Int. Cl.
*B65D 43/06* (2006.01)
*B65D 43/26* (2006.01)
*B65D 45/32* (2006.01)
*B65D 53/02* (2006.01)
*B65D 55/00* (2006.01)

(52) U.S. Cl.
CPC .............. *B65D 2543/00935* (2013.01); *B65D 2543/0099* (2013.01)

(58) Field of Classification Search
CPC .............. B65D 21/022; B65D 21/0222; B65D 21/0223; B65D 21/0224; B65D 21/0228; B65D 21/0233; B65D 21/062; B65D 21/08; B65D 2203/00; B65D 2203/02; B65D 2203/06; B65D 2203/10; B65D 2203/12; B65D 2205/00; B65D 2205/02; B65D 2215/02; B65D 2215/04; B65D 2231/022; B65D 2251/0012; B65D 2251/0015; B65D 2251/0018; B65D 2251/0021; B65D 2251/0025; B65D 2251/0028; B65D 2251/0056; B65D 2251/0071; B65D 2251/0075; B65D 2251/0078; B65D 2251/0081; B65D 2251/0087; B65D 2251/009; B65D 2251/0093; B65D 2251/0096; B65D 2251/01; B65D 2251/023; B65D 2251/04; B65D 2251/1008; B65D 2251/1016; B65D 2251/1025; B65D 2251/1041; B65D 2251/105; B65D 2251/1058; B65D 2251/1066; B65D 2251/1083; B65D 2251/20; B65D 2255/20; B65D 23/02; B65D 23/0857; B65D 2301/10; B65D 2313/04; B65D 2401/00; B65D 2401/05; B65D 2401/10; B65D 2401/15; B65D 2401/20; B65D 2401/25; B65D 2401/30; B65D 2401/35; B65D 25/005; B65D 25/02; B65D 25/04; B65D 25/08; B65D 25/10; B65D 25/103; B65D 25/108; B65D 25/20; B65D 25/205; B65D 25/22; B65D 25/24; B65D 25/28; B65D 25/2841; B65D 25/2894; B65D 25/32; B65D 25/34; B65D 25/36; B65D 25/38; B65D 25/48; B65D 25/54; B65D 2517/0011; B65D 2517/0014; B65D 2517/002; B65D 2517/0041; B65D 2517/0043; B65D 2517/0046; B65D 2517/0049; B65D 2517/0056; B65D 2517/0062; B65D 2517/0082; B65D 2517/0097; B65D 2517/5091; B65D 2519/00024; B65D 2519/00034; B65D 2519/00059; B65D 2519/00069; B65D 2519/00174; B65D 2519/00208; B65D 2519/00273; B65D 2519/00288; B65D 2519/00293; B65D 2519/00318; B65D 2519/00323; B65D 2519/00333; B65D 2519/00338; B65D 2519/00497; B65D 2519/00502; B65D 2519/00611; B65D 2519/00656; B65D 2519/00711; B65D 2519/00805; B65D 2519/009; B65D 2519/00975; B65D 2525/283; B65D 2525/287; B65D 2543/00009; B65D 2543/00027; B65D 2543/00046; B65D 2543/00092; B65D 2543/00101; B65D 2543/00148; B65D 2543/00175; B65D 2543/00194; B65D 2543/00231; B65D 2543/0024; B65D 2543/00268; B65D 2543/00277; B65D 2543/00296; B65D 2543/00314; B65D 2543/00342; B65D 2543/00351; B65D 2543/0037; B65D 2543/00407; B65D 2543/00416; B65D 2543/00425; B65D 2543/00435; B65D 2543/00462; B65D 2543/0049; B65D 2543/005; B65D 2543/00509; B65D 2543/00518; B65D 2543/00527; B65D 2543/00537; B65D 2543/00546; B65D 2543/00555; B65D 2543/00564; B65D 2543/00574; B65D 2543/0062; B65D 2543/00629; B65D 2543/00638; B65D 2543/00648; B65D 2543/00657; B65D 2543/00685; B65D 2543/00694; B65D 2543/00731; B65D 2543/0074; B65D 2543/00759; B65D 2543/00768; B65D 2543/00796; B65D 2543/00805; B65D 2543/00842; B65D 2543/00851; B65D 2543/00879; B65D 2543/00888; B65D 2543/00898; B65D 2543/00907; B65D 2543/00916; B65D 2543/00925; B65D 2543/00935; B65D 2543/00944; B65D 2543/00972; B65D 2543/0099; B65D 2547/066; B65D 2565/385; B65D 2571/00141; B65D 2571/00302; B65D 2571/0045; B65D 2571/0066; B65D 2571/00679; B65D 2571/00728; B65D 2575/583; B65D 2575/586; B65D 2577/205; B65D 2577/2083; B65D 2577/2091; B65D 2583/0409; B65D 2583/0481; B65D 3/22; B65D 33/00; B65D 39/0052; B65D 39/08; B65D 39/084; B65D 39/088; B65D 39/10; B65D 39/12; B65D 39/16; B65D 41/00; B65D 41/005; B65D 41/02; B65D 41/04; B65D 41/0407; B65D 41/0414; B65D 41/0428; B65D 41/0435; B65D 41/0442; B65D 41/045; B65D 41/0471; B65D 41/0485; B65D 41/06; B65D 41/16; B65D 41/17; B65D 41/28; B65D 41/32; B65D 41/34; B65D 41/3404; B65D 41/3409; B65D 41/3428; B65D 41/3438; B65D 41/3447; B65D 41/365; B65D 41/46; B65D 41/48; B65D 41/485; B65D 41/50; B65D 41/62; B65D 43/00; B65D 43/02; B65D 43/0202; B65D 43/0204; B65D 43/0208; B65D 43/021; B65D 43/0212; B65D 43/0214; B65D 43/0218; B65D 43/022; B65D 43/0222; B65D 43/0225; B65D 43/0229; B65D 43/0231; B65D 43/0256; B65D 43/0268; B65D 43/12; B65D 43/14; B65D 43/16; B65D 43/161; B65D 43/162; B65D 43/163; B65D 43/164; B65D 43/165; B65D 43/166; B65D 43/168; B65D 43/169; B65D 43/18; B65D 43/20; B65D 43/22; B65D 43/24; B65D 43/26; B65D 43/265; B65D 43/267; B65D 45/02; B65D 45/16; B65D 45/20; B65D 45/24; B65D 45/28; B65D 45/30; B65D 45/32; B65D 45/322; B65D 45/325; B65D 45/327; B65D 45/34; B65D 45/345; B65D 47/046; B65D 47/06; B65D 47/063; B65D 47/065; B65D 47/066; B65D 47/08;

B65D 47/0804; B65D 47/0809; B65D
47/0814; B65D 47/0819; B65D 47/0828;
B65D 47/0838; B65D 47/0847; B65D
47/0852; B65D 47/0861; B65D 47/0871;
B65D 47/0885; B65D 47/089; B65D
47/0895; B65D 47/10; B65D 47/103;
B65D 47/12; B65D 47/121; B65D
47/122; B65D 47/123; B65D 47/18;
B65D 47/20; B65D 47/2006; B65D
47/2018; B65D 47/2031; B65D 47/2043;
B65D 47/24; B65D 47/242; B65D
47/243; B65D 47/244; B65D 47/245;
B65D 47/247; B65D 47/248; B65D
47/249; B65D 47/26; B65D 47/263;
B65D 47/265; B65D 47/286; B65D
47/305; B65D 47/32; B65D 47/36; B65D
47/40; B65D 5/001; B65D 5/02; B65D
5/0227; B65D 5/029; B65D 5/10; B65D
5/2047; B65D 5/38; B65D 5/443; B65D
5/445; B65D 5/4608; B65D 5/5007;
B65D 5/509; B65D 5/541; B65D 5/6664;
B65D 5/68; B65D 5/74; B65D 5/746;
B65D 5/747; B65D 5/748; B65D 5/749;
B65D 50/00; B65D 50/04; B65D 50/041;
B65D 50/043; B65D 50/045; B65D
50/046; B65D 50/06; B65D 50/061;
B65D 51/002; B65D 51/007; B65D
51/04; B65D 51/145; B65D 51/16; B65D
51/1633; B65D 51/1644; B65D 51/1672;
B65D 51/1677; B65D 51/1683; B65D
51/1688; B65D 51/18; B65D 51/20;
B65D 51/22; B65D 51/222; B65D
51/224; B65D 51/226; B65D 51/227;
B65D 51/228; B65D 51/24; B65D
51/242; B65D 51/243; B65D 51/245;
B65D 51/246; B65D 51/247; B65D
51/248; B65D 51/28; B65D 51/2807;
B65D 51/2821; B65D 51/2835; B65D
51/32; B65D 53/00; B65D 53/02; B65D
53/04; B65D 53/06; B65D 55/02; B65D
55/022; B65D 55/024; B65D 55/026;
B65D 55/06; B65D 55/0818; B65D
55/12; B65D 55/14; B65D 55/16; B65D
65/46; B65D 65/466; B65D 7/04; B65D
71/06; B65D 71/10; B65D 71/16; B65D
71/18; B65D 71/26; B65D 71/36; B65D
71/50; B65D 71/70; B65D 75/327;
B65D 75/58; B65D 75/5872; B65D 75/5877;
B65D 75/5883; B65D 77/04; B65D
77/0466; B65D 77/0493; B65D 77/06;
B65D 77/061; B65D 77/2024; B65D
77/2064; B65D 77/24; B65D 77/283;
B65D 77/38; B65D 79/00; B65D 79/02;
B65D 81/00; B65D 81/02; B65D 81/05;
B65D 81/127; B65D 81/18; B65D
81/2038; B65D 81/2076; B65D 81/264;
B65D 81/266; B65D 81/267; B65D
81/28; B65D 81/32; B65D 81/3205;
B65D 81/3211; B65D 81/3216; B65D
81/3222; B65D 81/325; B65D 81/3261;
B65D 81/3543; B65D 81/38; B65D
81/3813; B65D 81/3816; B65D 81/3818;
B65D 81/3823; B65D 81/3841; B65D
81/3865; B65D 81/3869; B65D 81/3874;
B65D 81/3897; B65D 83/00; B65D
83/0005; B65D 83/0038; B65D 83/005;
B65D 83/0055; B65D 83/02; B65D
83/04; B65D 83/0409; B65D 83/0418;
B65D 83/0454; B65D 83/0463; B65D
83/06; B65D 83/08; B65D 83/0805;
B65D 83/14; B65D 83/16; B65D 83/20;
B65D 83/205; B65D 83/206; B65D
83/22; B65D 83/262; B65D 83/267;
B65D 83/38; B65D 83/384; B65D
83/386; B65D 83/40; B65D 83/425;
B65D 83/54; B65D 83/56; B65D 83/64;
B65D 83/68; B65D 83/756; B65D 85/00;
B65D 85/10; B65D 85/1045; B65D
85/10484; B65D 85/20; B65D 85/30;
B65D 85/324; B65D 85/34; B65D 85/36;
B65D 85/38; B65D 85/62; B65D 85/70;
B65D 85/72; B65D 85/804; B65D
85/8043; B65D 85/8046; B65D 85/8049;
B65D 85/8052; B65D 85/8055; B65D
85/8058; B65D 85/8061; B65D 85/8064;
B65D 85/8067; B65D 88/126; B65D
88/54; B65D 90/046; B65D 90/10; B65D
90/34; B65D 1/0215; B65D 1/0261;
B65D 1/0276; B65D 1/0284; B65D
1/0292; B65D 1/04; B65D 1/08; B65D
1/10; B65D 1/16; B65D 1/20; B65D
1/243; B65D 1/323; B65D 1/48; B65D
11/00; B65D 11/04; B65D 11/08; B65D
11/20; B65D 13/02; B65D 17/30; B65D
17/40; B65D 17/4011; B65D 17/404;
B65D 17/502; B65D 19/06; B65D 19/12;
B65D 19/44; B65D 21/02; B65D
21/0202; B65D 21/0204; B65D 21/0213;
B65D 21/0226; B65D 21/023; B65D
21/064; B65D 21/086; B65D 2207/00;
B65D 2209/00; B65D 2211/00; B65D
2215/06; B65D 2217/00; B65D 2221/00;
B65D 2231/004; B65D 2231/008; B65D
2231/02; B65D 2251/0003; B65D
2251/0031; B65D 2251/026; B65D
2251/08; B65D 2251/10; B65D
2251/1033; B65D 2251/1075; B65D
2251/1091; B65D 2251/205; B65D
2255/00; B65D 23/00; B65D 23/001;
B65D 23/003; B65D 23/04; B65D 23/06;
B65D 23/0885; B65D 23/102; B65D
23/108; B65D 23/12; B65D 23/14; B65D
2301/02; B65D 2401/50; B65D 2401/55;
B65D 25/00; B65D 25/06; B65D 25/101;
B65D 25/14; B65D 25/16; B65D
25/2808; B65D 25/2858; B65D 25/2885;
B65D 25/385; B65D 25/40; B65D 25/42;
B65D 25/44; B65D 25/46; B65D 25/465;
B65D 25/52; B65D 25/56; B65D
2501/0081; B65D 2517/0013; B65D
2517/0028; B65D 2517/0037; B65D
2517/0038; B65D 2517/0044; B65D
2517/0052; B65D 2517/0061; B65D
2517/0083; B65D 2517/0094; B65D
2517/0098; B65D 2517/5056; B65D
2519/00029; B65D 2519/00164; B65D
2519/00169; B65D 2519/00199; B65D
2519/00203; B65D 2519/00422; B65D
2519/00512; B65D 2519/00532; B65D
2519/00587; B65D 2519/00641; B65D

2519/00661; B65D 2519/00731; B65D
2519/0082; B65D 2539/003; B65D
2543/00018; B65D 2543/00074; B65D
2543/00083; B65D 2543/00157; B65D
2543/00203; B65D 2543/00287; B65D
2543/00379; B65D 2543/00472; B65D
2543/00592; B65D 2543/00666; B65D
2543/00703; B65D 2543/0075; B65D
2543/00814; B65D 2543/00824; B65D
2543/00833; B65D 2543/0087; B65D
2543/00953; B65D 2543/00981; B65D
2555/02; B65D 2577/043; B65D
2577/047; B65D 2581/344; B65D
2581/3498; B65D 2583/005; B65D
2583/0468; B65D 2583/0477; B65D
2583/049; B65D 2583/082; B65D
2585/545; B65D 2585/56; B65D
2585/6817; B65D 2585/687; B65D
585/86; B65D 2590/0083; B65D 3/00;
B65D 3/06; B65D 3/20; B65D 31/10;
B65D 31/14; B65D 33/01; B65D 33/02;
B65D 33/16; B65D 35/14; B65D 35/22;
B65D 35/24; B65D 35/28; B65D 35/285;
B65D 35/30; B65D 35/36; B65D 35/38;
B65D 35/40; B65D 35/42; B65D 35/44;
B65D 35/46; B65D 39/0005; B65D
39/0076; B65D 39/04; B65D 41/21;
B65D 41/0492; B65D 41/065; B65D
41/08; B65D 41/086; B65D 41/12;
B65D 41/165; B65D 41/18; B65D 41/20;
B65D 41/26; B65D 41/325; B65D 41/3419;
B65D 31/3423; B65D 41/3495; B65D
41/38; B65D 41/42; B65D 41/58; B65D
43/0206; B65D 43/0237; B65D 43/0239;
B65D 43/0241; B65D 43/0249; B65D
43/0252; B65D 43/0254; B65D 43/0272;
B65D 43/06; B65D 43/08; B65D 43/167;
B65D 43/262; B65D 45/00; B65D
45/025; B65D 45/06; B65D 45/08; B65D
45/18; B65D 45/22; B65D 47/00; B65D
47/04; B65D 47/043; B65D 47/061;
B65D 47/0823; B65D 47/0833; B65D
47/0842; B65D 47/0857; B65D 47/0866;
B65D 47/0876; B65D 47/088; B65D
47/127; B65D 47/128; B65D 47/14;
B65D 47/141; B65D 47/2012; B65D
47/2037; B65D 47/205; B65D 47/2062;
B65D 47/2068; B65D 47/2075; B65D
47/2081; B65D 47/2087; B65D 47/2093;
B65D 47/241; B65D 47/261; B65D
47/268; B65D 47/28; B65D 47/283;
B65D 47/30; B65D 47/38; B65D 47/42;
B65D 49/02; B65D 49/04; B65D 49/08;
B65D 5/067; B65D 5/2033; B65D 5/209;
B65D 5/22; B65D 5/248; B65D 5/36;
B65D 5/3607; B65D 5/3621; B65D
5/3664; B65D 5/42; B65D 5/4204; B65D
5/422; B65D 5/4233; B65D 5/4245;
B65D 5/425; B65D 5/4258; B65D
5/4266; B65D 5/4291; B65D 5/4295;
B65D 5/441; B65D 5/46008; B65D
5/46024; B65D 5/46096; B65D 5/50;
B65D 5/5038; B65D 5/52; B65D 5/5213;
B65D 5/563; B65D 5/64; B65D 5/66;
B65D 5/6602; B65D 5/6608; B65D
5/6611; B65D 5/6626; B65D 5/6667;
B65D 5/6691; B65D 5/721; B65D 5/727;
B65D 50/02; B65D 50/048; B65D
50/062; B65D 50/067; B65D 50/068;
B65D 51/00; B65D 51/1605; B65D
51/1611; B65D 51/1616; B65D 51/1622;
B65D 51/165; B65D 51/1661; B65D
51/185; B65D 51/241; B65D 51/244;
B65D 51/249; B65D 51/26; B65D
51/2814; B65D 51/2857; B65D 51/2864;
B65D 51/2892; B65D 51/30; B65D
55/00; B65D 55/028; B65D 55/066;
B65D 55/08; B65D 55/0827; B65D
55/0854; B65D 55/0863; B65D 55/10;
B65D 55/145; B65D 59/00; B65D 59/08;
B65D 65/40; B65D 7/045; B65D 7/06;
B65D 7/40; B65D 71/502; B65D
73/0085; B65D 75/008; B65D 75/30;
B65D 75/32; B65D 75/326; B65D 75/34;
B65D 75/36; B65D 75/366; B65D 75/42;
B65D 75/527; B65D 75/56; B65D
75/5838; B65D 75/5855; B65D 75/5866;
B65D 75/5894; B65D 77/02; B65D
77/0406; B65D 77/0453; B65D 77/048;
B65D 77/0486; B65D 77/065; B65D
77/067; B65D 77/068; B65D 77/20;
B65D 77/2016; B65D 77/2032; B65D
77/208; B65D 77/2088; B65D 77/22;
B65D 77/225; B65D 77/245; B65D
77/28; B65D 77/30; B65D 79/0087;
B65D 81/022; B65D 81/025; B65D
81/052; B65D 81/07; B65D 81/113;
B65D 81/20; B65D 81/2007; B65D
81/2015; B65D 21/2053; B65D 81/22;
B65D 81/24; B65D 81/245; B65D 81/26;
B65D 81/268; B65D 81/30; B65D
81/3227; B65D 81/3233; B65D 81/3255;
B65D 81/3266; B65D 81/3283; B65D
81/3288; B65D 81/3453; B65D 81/3484;
B65D 81/36; B65D 81/361; B65D
81/365; B65D 81/366; B65D 81/3837;
B65D 81/3876; B65D 81/3888; B65D
83/0011; B65D 83/0022; B65D 83/0033;
B65D 83/0044; B65D 83/0061; B65D
83/0072; B65D 83/0077; B65D 83/0094;
B65D 83/0427; B65D 83/0481; B65D
83/049; B65D 83/0811; B65D 83/0817;
B65D 83/0829; B65D 83/0835; B65D
83/0882; B65D 83/0894; B65D 83/10;
B65D 83/12; B65D 83/201; B65D
83/202; B65D 83/203; B65D 83/207;
B65D 83/226; B65D 83/228; B65D
83/24; B65D 83/26; B65D 83/28; B65D
83/285; B65D 83/30; B65D 83/303;
B65D 83/306; B65D 83/32; B65D 83/34;
B65D 83/345; B65D 83/36; B65D
83/382; B65D 83/388; B65D 83/42;
B65D 83/44; B65D 83/46; B65D 83/48;
B65D 83/52; B65D 83/525; B65D
83/546; B65D 83/60; B65D 83/62; B65D
83/646; B65D 83/66; B65D 83/663;
B65D 83/682; B65D 83/687; B65D
83/70; B65D 83/72; B65D 83/75; B65D
83/752; B65D 83/753; B65D 83/7532;
B65D 83/7535; B65D 83/754; B65D

85/1009; B65D 85/1036; B65D 85/1056; B65D 85/10564; B65D 85/10568; B65D 85/1081; B65D 85/12; B65D 85/18; B65D 85/24; B65D 85/345; B65D 85/48; B65D 85/50; B65D 85/60; B65D 85/672; B65D 85/68; B65D 85/73; B65D 85/78; B65D 85/84; B65D 88/12; B65D 88/121; B65D 88/522; B65D 88/524; B65D 88/66; B65D 88/68; B65D 90/00; B65D 90/0013; B65D 90/0026; B65D 90/0033; B65D 90/008; B65D 90/023; B65D 90/08; B65D 90/105; B65D 90/18; B65D 90/205; B65D 90/22; B65D 90/48; B65D 90/54; B65D 90/626; A47J 47/02; Y02E 60/10

USPC ......... 220/1.5, 2.1 R, 200, 201, 202, 203.01, 220/203.02, 203.04, 203.05, 203.06, 220/203.07, 203.08, 203.09, 203.1, 220/203.11, 203.12, 203.13, 203.15, 220/203.16, 203.17, 203.18, 203.19, 220/203.21, 203.22, 203.23, 203.26, 220/203.27, 203.28, 203.29, 210, 211, 220/212, 212.5, 213, 214, 215, 216, 219, 220/221, 227, 228, 229, 23.2, 23.4, 23.6, 220/23.8, 23.83, 23.86, 23.87, 23.88, 220/23.89, 23.91, 230, 231, 232, 233, 220/234, 235, 236, 237, 238, 239, 240, 220/241, 243, 244, 246, 250, 251, 252, 220/253, 254.1, 254.2, 254.3, 254.4, 220/254.5, 254.6, 245.7, 254.8, 254.9, 220/255, 255.1, 256.1, 257.1, 257.2, 220/258.1, 258.2, 258.3, 258.4, 258.5, 220/259.1, 259.2, 259.3, 259.4, 259.5, 220/260, 262, 263, 264, 265, 266, 267, 220/268, 269, 270, 271, 273, 274, 276, 220/277, 278, 279, 280, 281, 282, 283, 220/284, 285, 286, 287, 288, 289, 290, 220/291, 293, 294, 295, 296, 297, 298, 220/3.2, 3.8, 3.9, 300, 301, 302, 303, 220/304, 305, 309.1, 309.2, 310.1, 314, 220/315, 316, 318, 319, 320, 321, 322, 220/323, 324, 325, 326, 327, 328, 345.1, 220/345.2, 345.3, 345.4, 345.6, 348, 350, 220/351, 359.1, 359.2, 359.3, 359.4, 220/359.5, 360, 361, 362, 363, 364, 220/366.1, 367.1, 368, 370, 371, 372, 220/373, 374, 375, 376, 377, 378, 379, 220/380, 4.01, 4.02, 4.03, 4.04, 4.05, 220/4.08, 4.09, 4.12, 4.21, 4.22, 4.23, 220/4.24, 4.25, 4.26, 4.27, 4.28, 4.29, 220/4.33, 484, 495.01, 495.02, 495.03, 220/495.06, 495.08, 500, 501, 502, 503, 220/504, 505, 506, 507, 508, 509, 516, 220/520, 521, 522, 523, 524, 525, 526, 220/527, 528, 529, 532, 533, 553, 555, 220/556, 557, 560.01, 560.03, 561, 564, 220/567.1, 570, 571, 571.1, 572, 573.1, 220/573.4, 574, 574.1, 575, 578, 580, 220/592.01, 592.14, 592.16, 592.17, 220/592.18, 592.19, 592.2, 592.24, 220/592.25, 592.26, 592.27, 6, 600, 601, 220/602, 604, 605, 606, 608, 609, 610, 220/611, 612, 613, 614, 615, 616, 617, 220/618, 619, 62, 62.11, 62.12, 62.14, 220/62.15, 62.18, 62.19, 62.2, 62.21, 220/62.22, 620, 621, 622, 623, 624, 625, 220/626, 627, 628, 629, 630, 631, 634, 220/635, 636, 640, 641, 642, 643, 644, 220/645, 646, 648, 651, 654, 655, 656, 220/657, 658, 659, 660, 661, 662, 666, 220/669, 671, 672, 675, 676, 677, 678, 220/681, 682, 683, 685, 689, 694, 698, 7, 220/700, 701, 702, 703, 705, 707, 708, 220/709, 710.5, 711, 712, 713, 714, 715, 220/716, 717, 718, 719, 720, 721, 723, 220/724, 729, 730, 731, 732, 733, 735, 220/737, 739, 740, 745, 746, 751, 752, 220/753, 754, 755, 756, 758, 759, 760, 220/761, 762, 763, 764, 765, 766, 768, 220/769, 770, 771, 772, 773, 774, 775, 220/776, 780, 781, 782, 783, 784, 785, 220/786, 787, 788, 789, 790, 791, 792, 220/793, 794, 795, 796, 797, 798, 799, 8, 220/800, 801, 802, 803, 804, 805, 806, 220/810, 811, 812, 813; 220/816, 817, 220/819, 820, 821, 825, 826, 827, 829, 220/830, 831, 832, 833, 834, 835, 836, 220/837, 838, 839, 840, 841, 842, 844, 220/845, 846, 847, 849, 86.1, 88.1, 88.2, 220/89.1, 89.2, 89.4, 890, 9.1, 9.4, 902, 220/904, 906, 908, 908.1, 908.2, 912, 220/913, 915, 915.1, 916, 917, DIG. 1, 220/DIG. 13, DIG. 14, DIG. 16, DIG. 19, 220/DIG. 2, DIG. 25, DIG. 26, DIG. 27, 220/DIG. 29, DIG. 3, DIG. 33, DIG. 34, 220/DIG. 6, DIG. 9

See application file for complete search history.

(56) References Cited

FOREIGN PATENT DOCUMENTS

| | | | | |
|---|---|---|---|---|
| CN | 109703869 A | * | 5/2019 | ............. B65D 23/00 |
| CN | 210503866 U | * | 5/2020 | ............. B65D 53/02 |
| CN | 215045212 U | * | 12/2021 | ............. B65D 43/02 |
| CN | 215045213 U | * | 12/2021 | ............. B65D 43/26 |
| CN | 215127286 U | * | 12/2021 | ............. A47J 27/21 |
| KR | 20170012330 A | * | 2/2017 | ............. B65D 45/28 |

* cited by examiner

SEALED STORAGE BOX WITH PUSH CLOSURE

TECHNICAL FIELD

The present invention refers to a sealed storage box.

Background Art

It is very common to use sealed storage boxes for food storage and other materials, and the market is hungry for new and efficient boxes of this kind. The present invention discloses a new and innovative sealed storage box.

DESCRIPTION OF THE DRAWINGS

The intention of the drawings attached to the application is not to limit the scope of the invention and its application. The drawings are intended only to illustrate the invention and they constitute only one of its many possible implementations.

THE INVENTION

The main object of the present invention is to provide a storage box (10) that includes a container (20) that is designed to contain food or other materials that the user wants to store, a lid (30) that is designed to cover and seal the top opening of the container and a circular seal (40).

Figure 1:
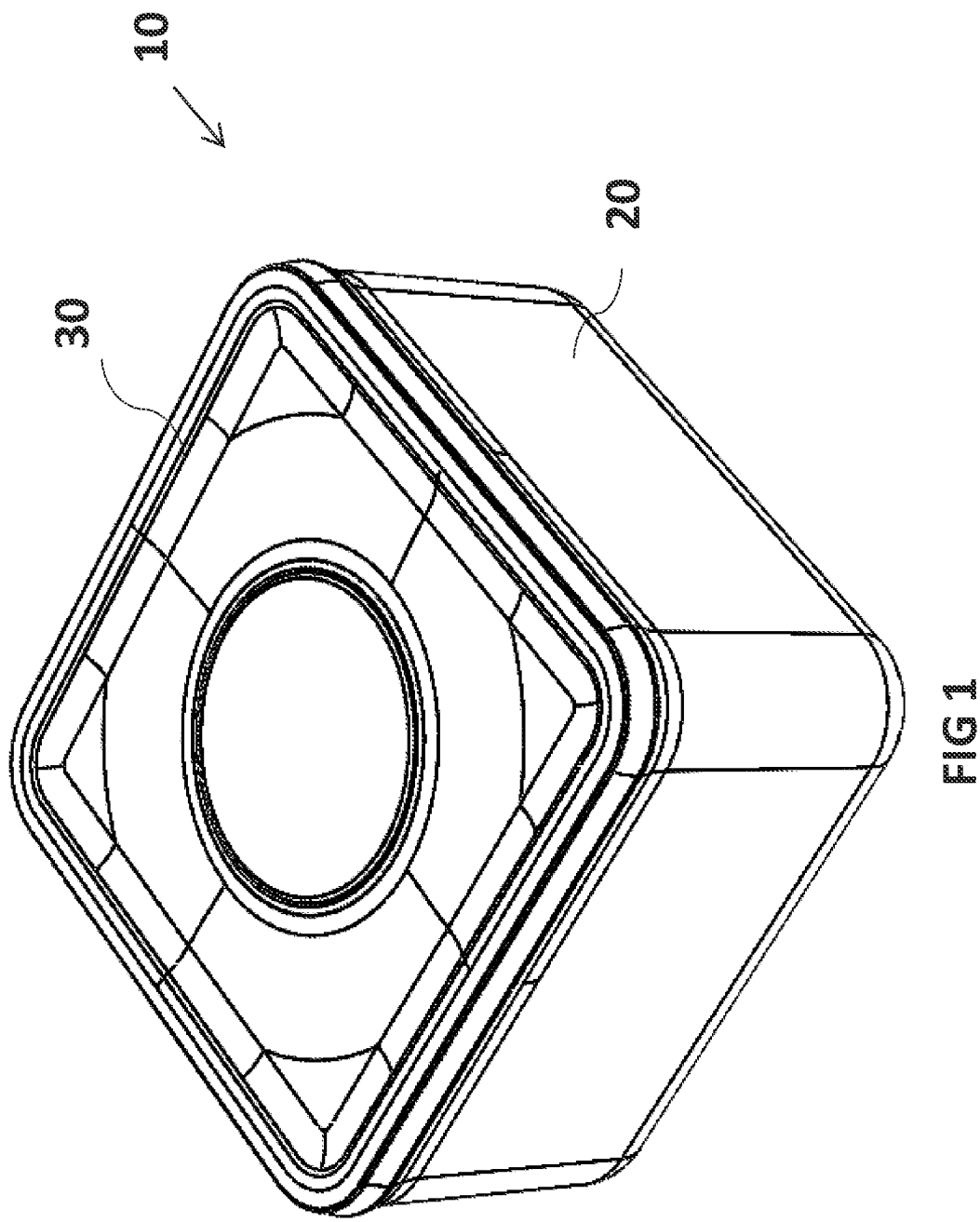
FIG. 1 depicts the storage box (10) that includes the container and the lid.
Figure 2:
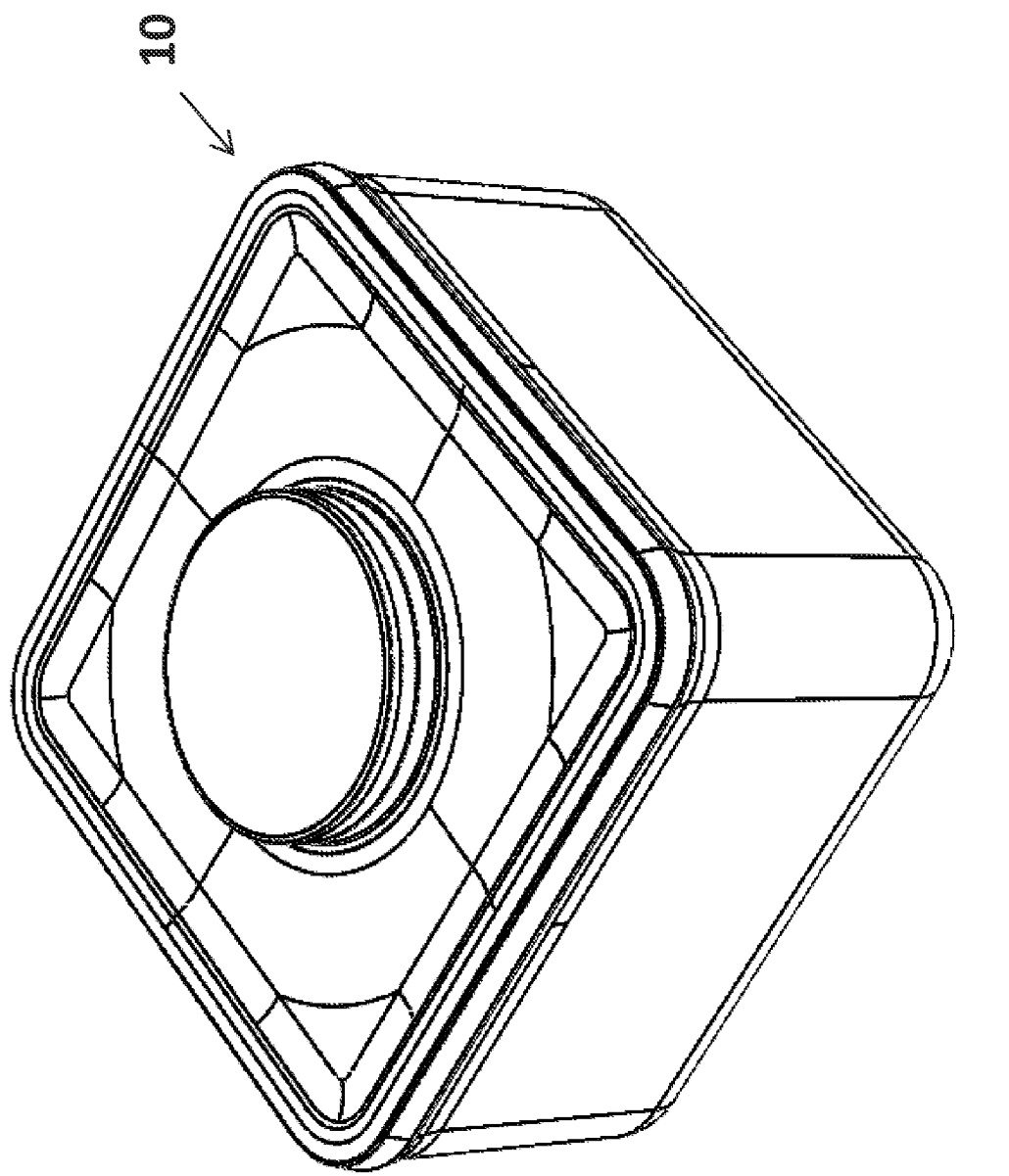
FIG. 2 depicts the storage box (10) in the extended open position.
Figure 3:
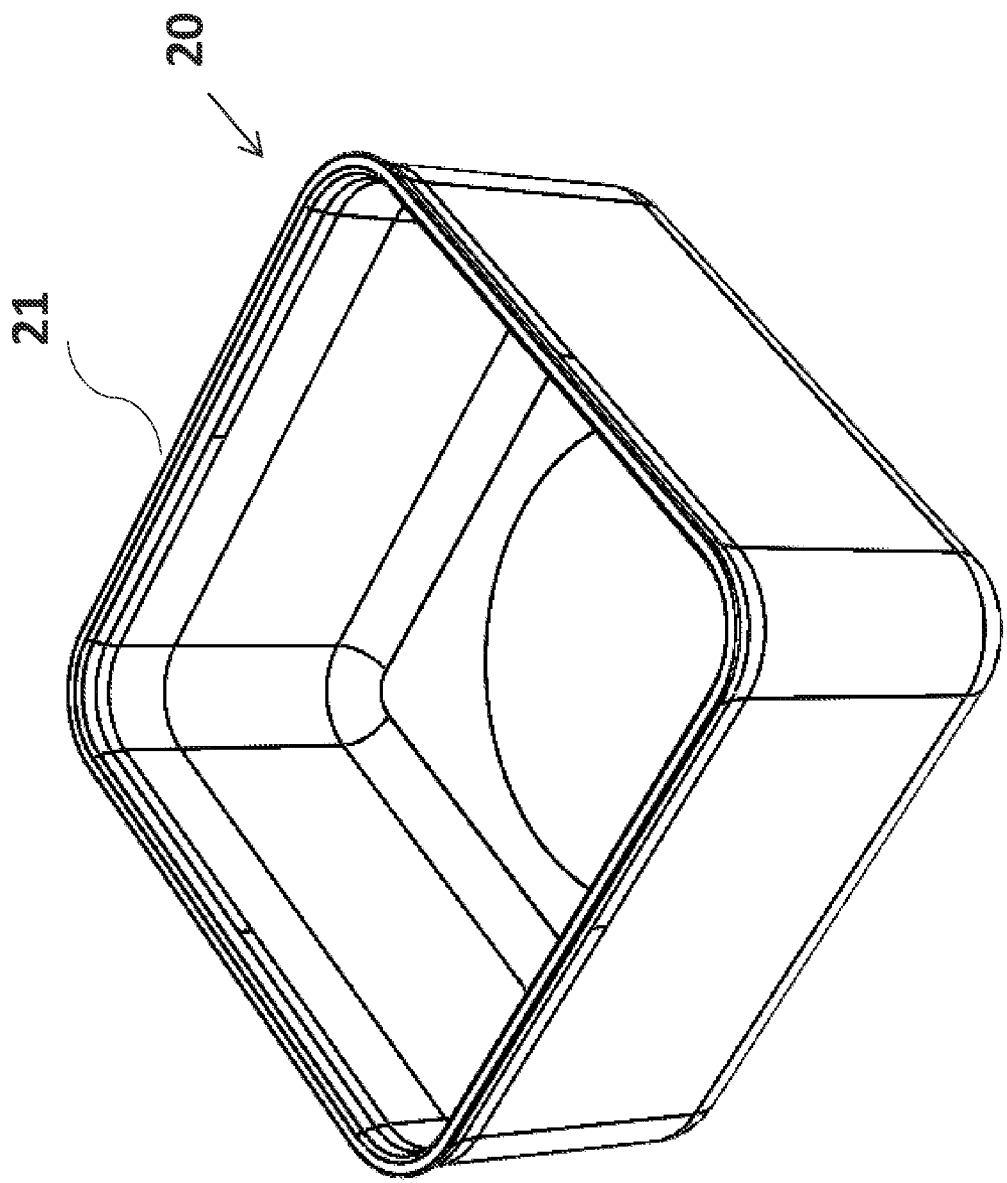
FIG. 3 depicts the container (20).

The container (20) is designed with a peripheral lip (21) on which the lid (30) is designed to be positioned. FIG. 1 depicts the storage box (10) that includes the container (20) and the lid (30). FIG. 2 depicts the storage box (10) in an open position. FIG. 3 depicts the container (20).

Figure 4:
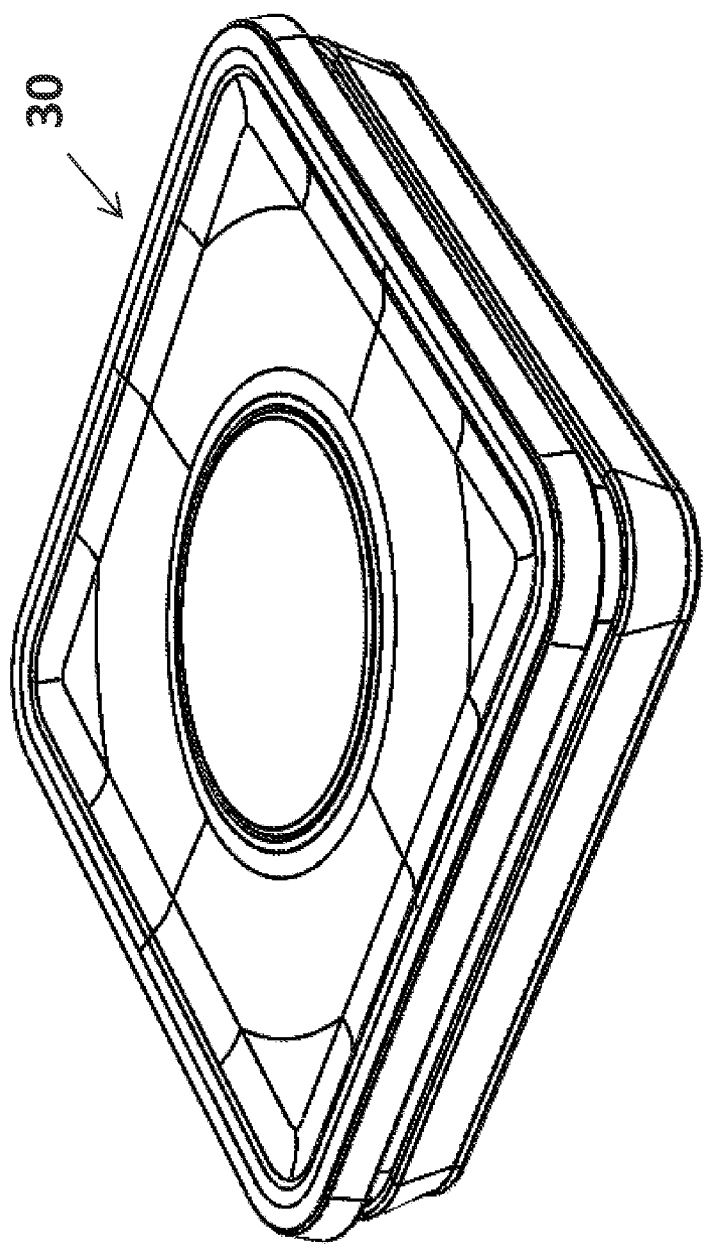
FIG. 4 depicts a top view of the lid (30).
Figure 5:
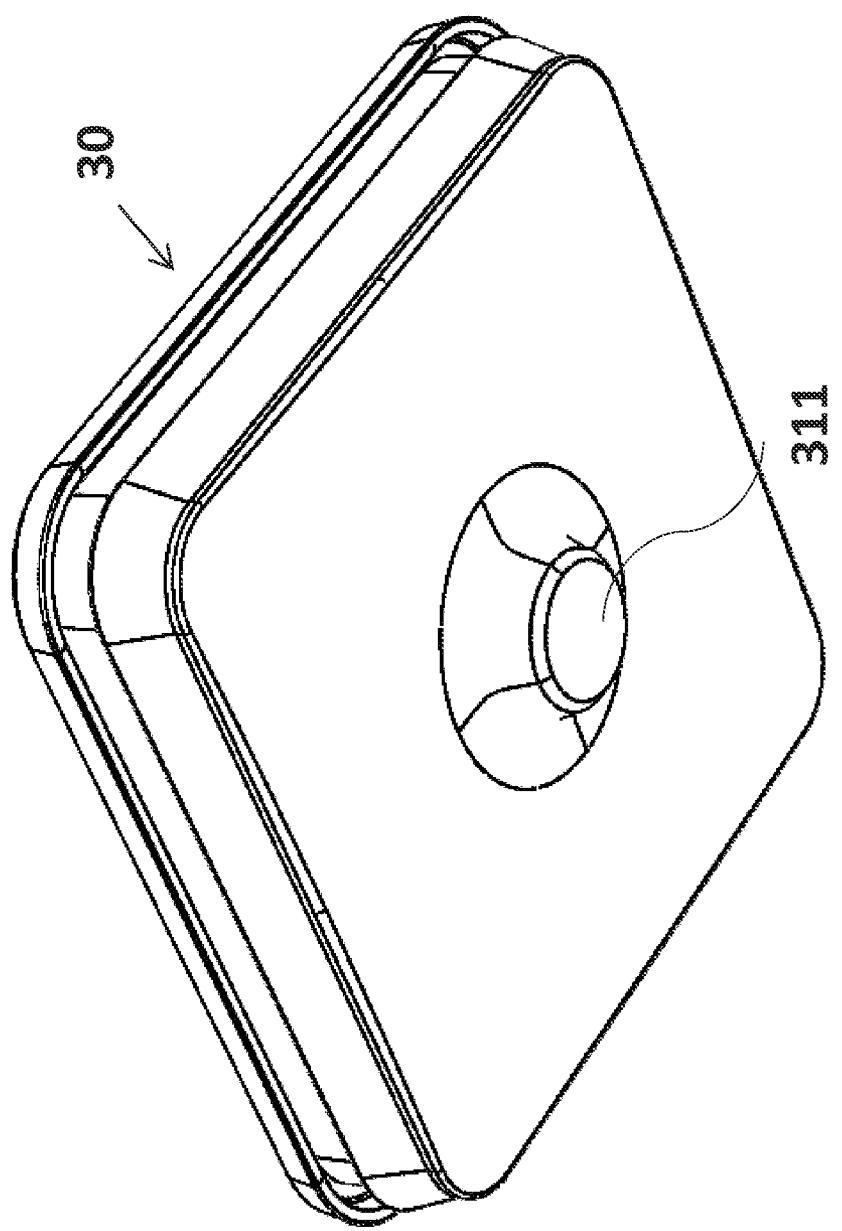
FIG. 5 depicts a bottom view of the lid (30).
Figure 6:
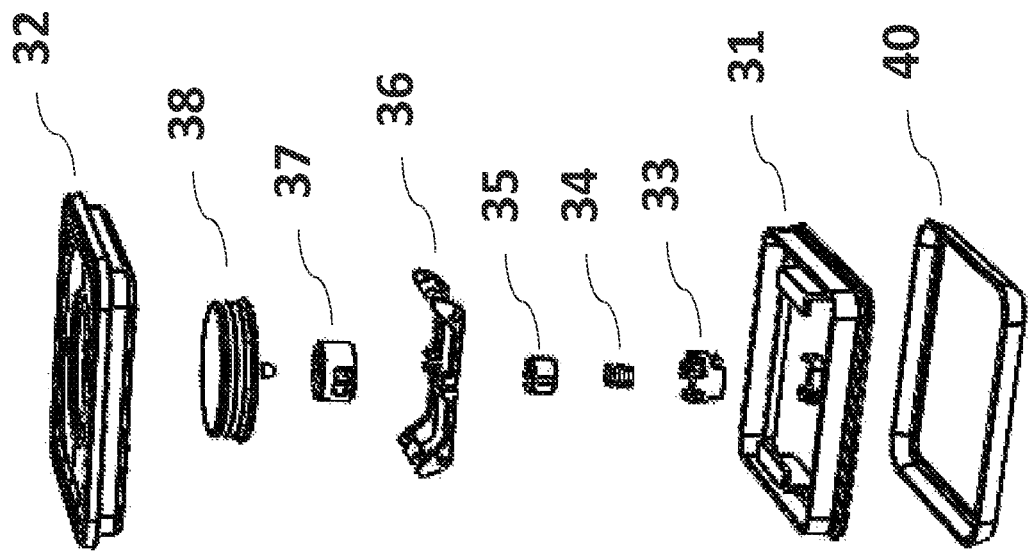
FIG. 6 is an exploded view of the lid (30) and its parts with the circular seal.

The lid (30) includes a bottom part (31), a top part (32), a snap body (33), a spring (34), a bottom cog-wheel (35), two lever bodies (36), a top cog-wheel (37) and a push button (38). FIG. 4 depicts a top view of the lid (30) and FIG. 5 depicts a bottom view of the lid (30). FIG. 6 is an exploded view of the lid (30) and its parts with the circular seal (40).

Figure 7:
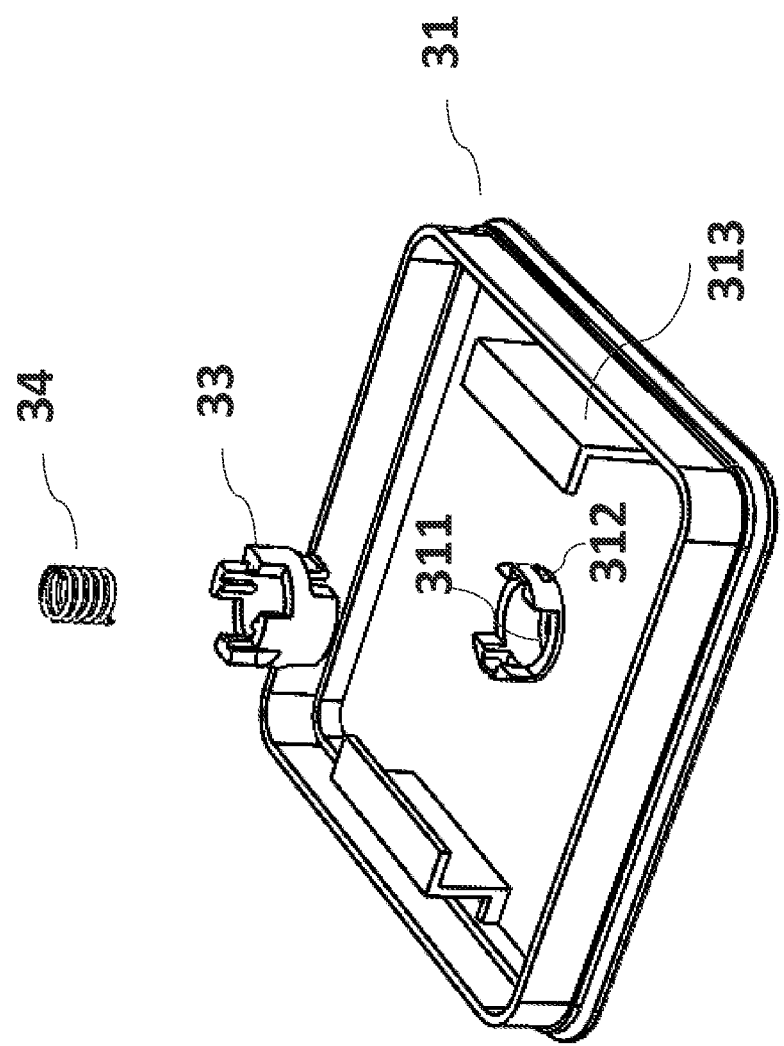
FIG. 7 is an exploded view of the bottom part (31) and its parts.
Figure 8:
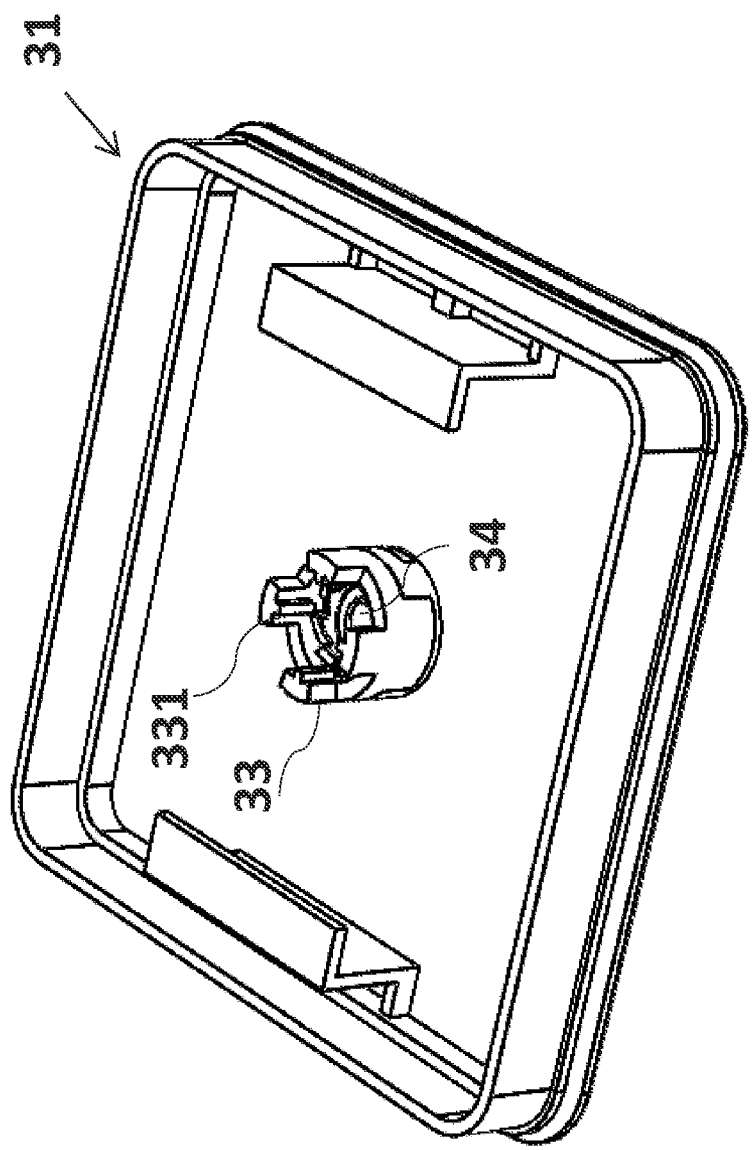
FIG. 8 depicts the bottom part (31) and its parts assembled.

The bottom part (31) includes an indentation at the base (311) that is adapted to contain the spring (34). The snap part (33) is connected by inserting tabs into side oriented holes at the bottom part (312). FIG. 7 depicts assembly explosion view of the bottom part (31), the snap part (33) and the spring (34), FIG. 8 depicts the bottom part (31) assembled when the spring (34) is positioned in the indentation at the base (311) and the snap part (33) is snaped to its oriented place (312).

Figure 9:
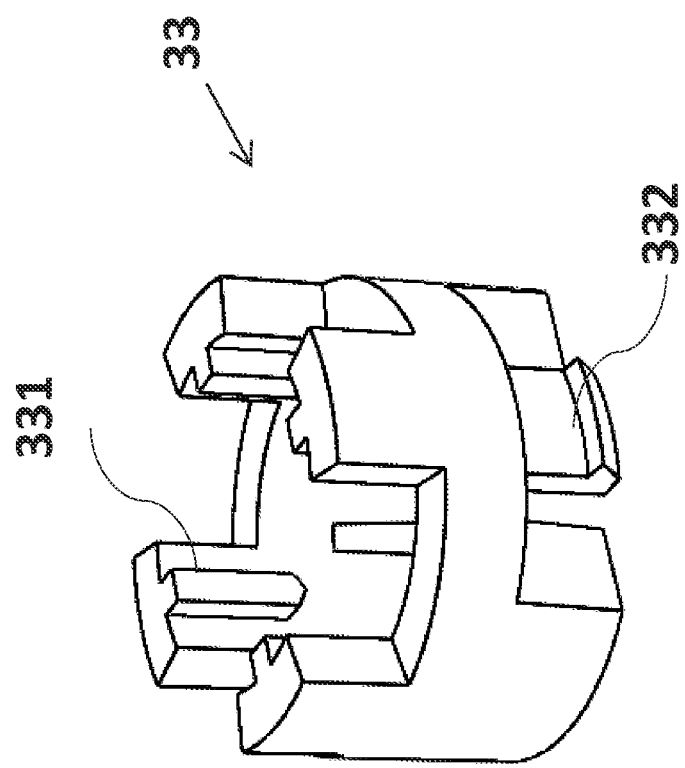
FIG. 9 depicts the snap part (33).

The snap part (33) as showed in FIG. 9 includes 4 or more stopping members (331) and 2 or more snapes (332).

Figure 10:
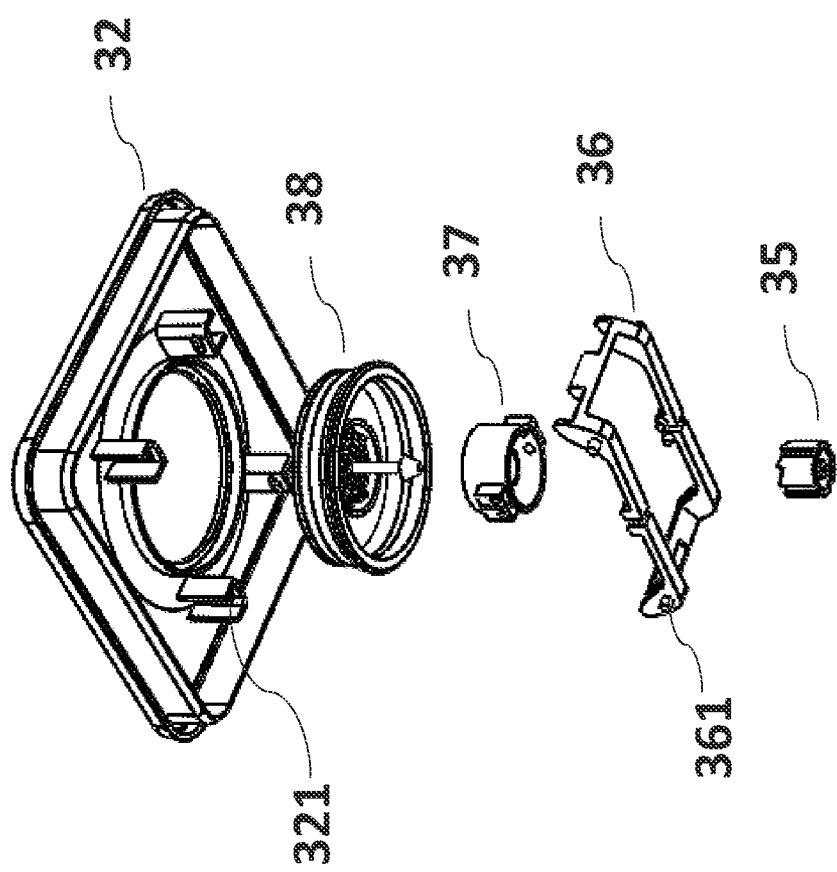
FIG. 10 is an exploded view of the top part (32) and its parts.
Figure 11:
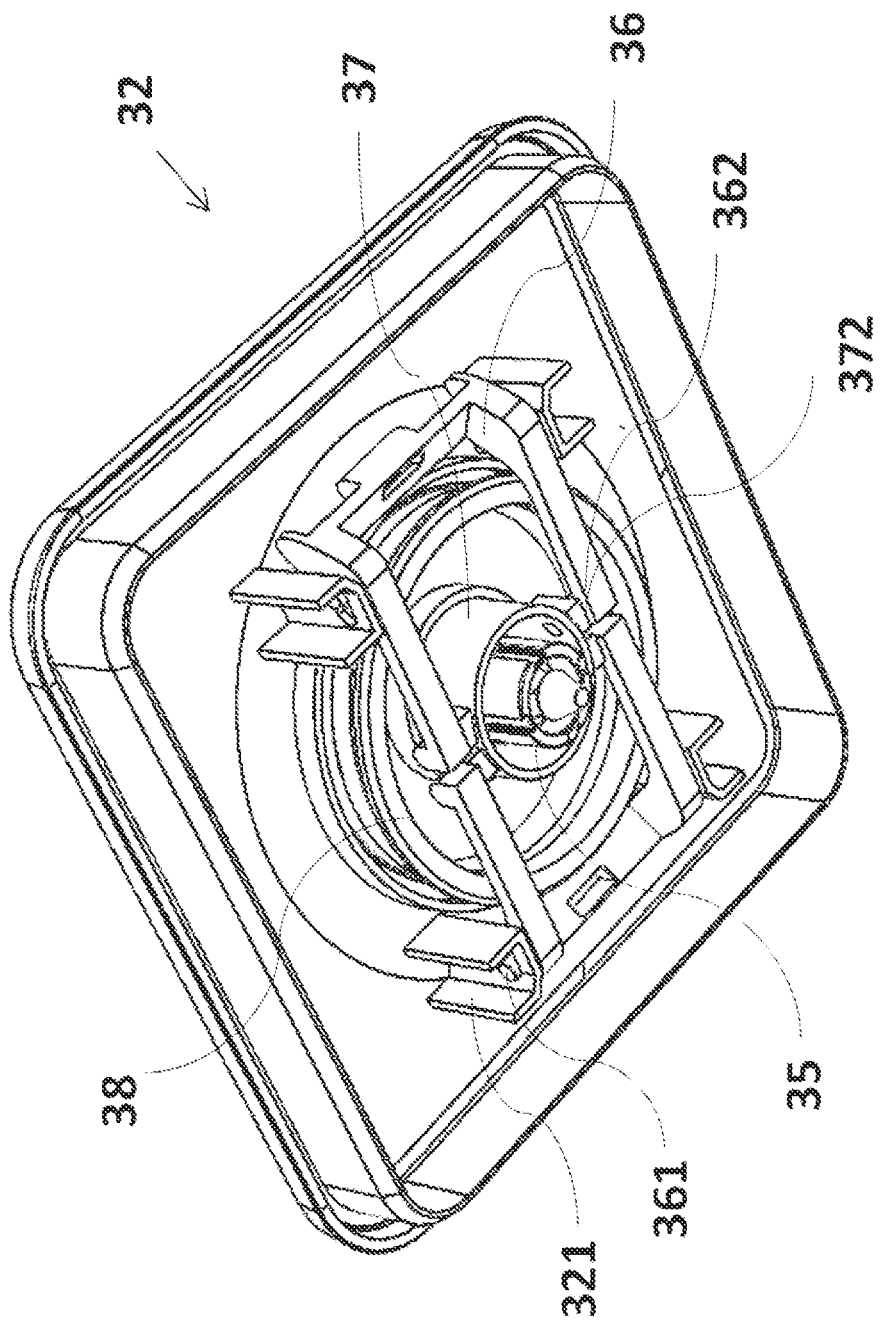
FIG. 11 depicts the top part (32) and its parts assembled.

The top part (32) includes 4 walls (321) that are adapted to contain the 2 lever bodies (36) after inserting the push button (38) the top cog-wheel (37) connected to the 2 lever bodies (36) and the bottom cog-wheel part (35). FIG. 10 depicts assembly explosion view of the top part (32), the top button (38) the top cog-wheel part (37) the 2 lever bodies (36) and the bottom cog-wheel part (35), FIG. 11 depicts the top part (32) assembled when the 2 lever bodies axis (362) are connected to the top cog-wheel part (372) and axis (361) are connected to the top part (321) both are connected to the push button (38) with the bottom cog-wheel part (35).

Figure 12:
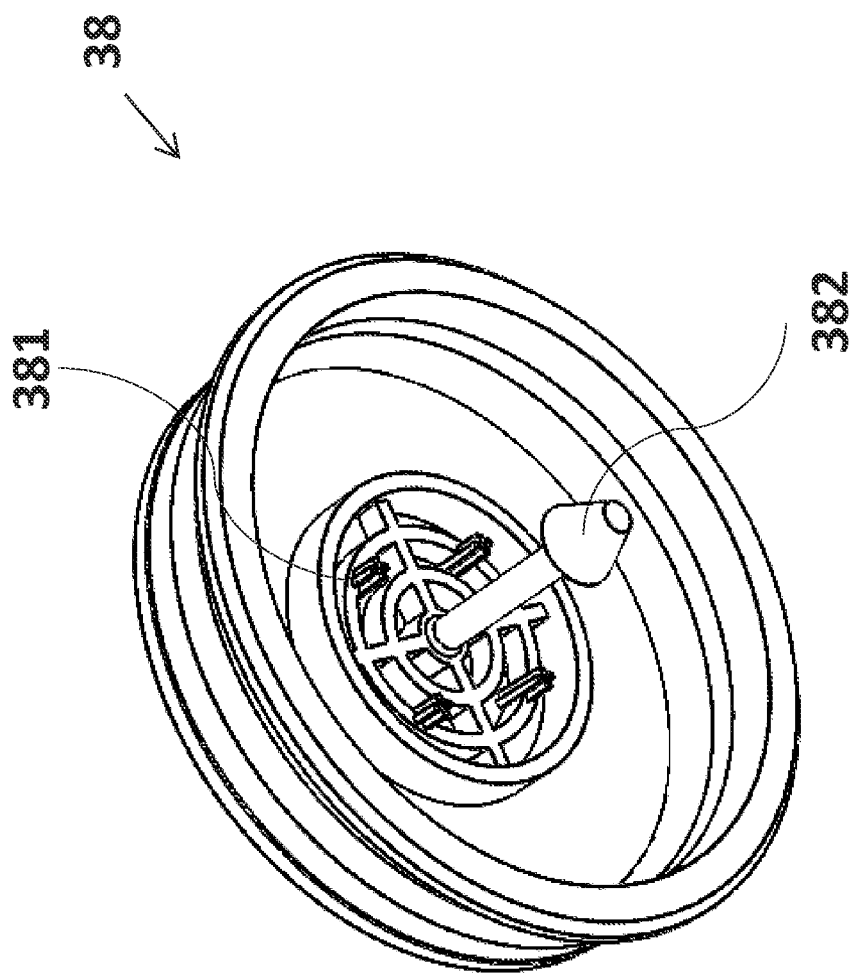
FIG. 12 depicts the push button handle part (38).

The push button (38) as showed in FIG. 12 includes 4 or more bosses (381) to be inserted to the top cog-wheel part-oriented holes (373) and a main snap (382) to connect the top cog-wheel part (37) the 2 lever bodies (36) and the bottom cog-wheel part (35).

Figure 13:
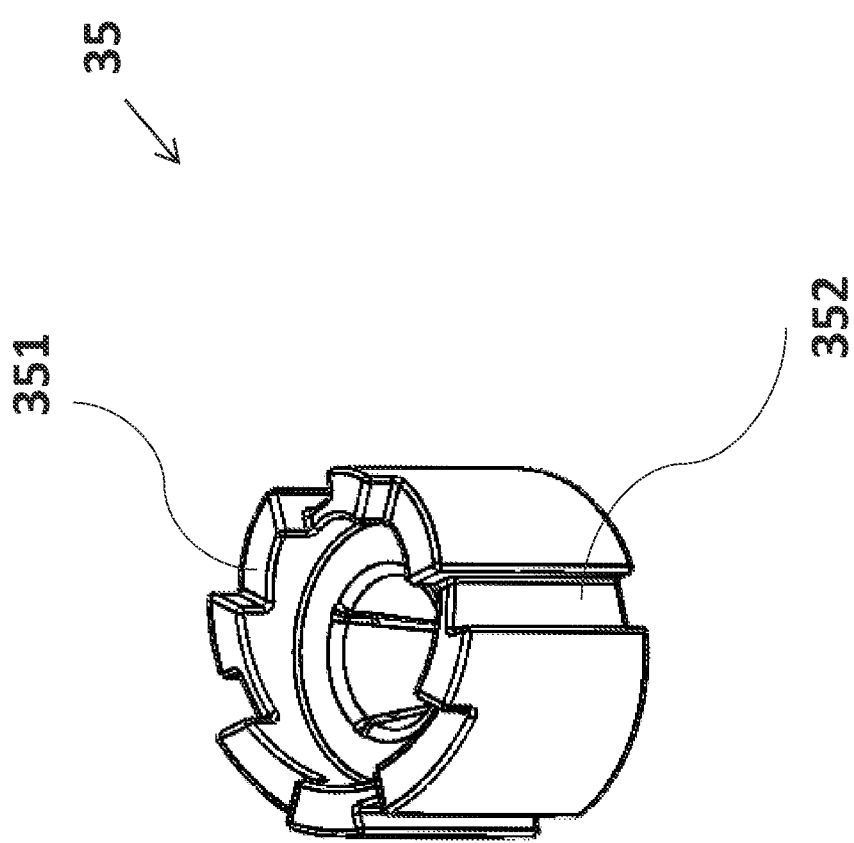
FIG. 13 depicts the bottom cog-wheel part (35).

The bottom cog-wheel part (35) as showed in FIG. 13 includes several indents (352) but it can have more or less, and includes 8 sloping teeth (351) but it can have more or less.

Figure 14:
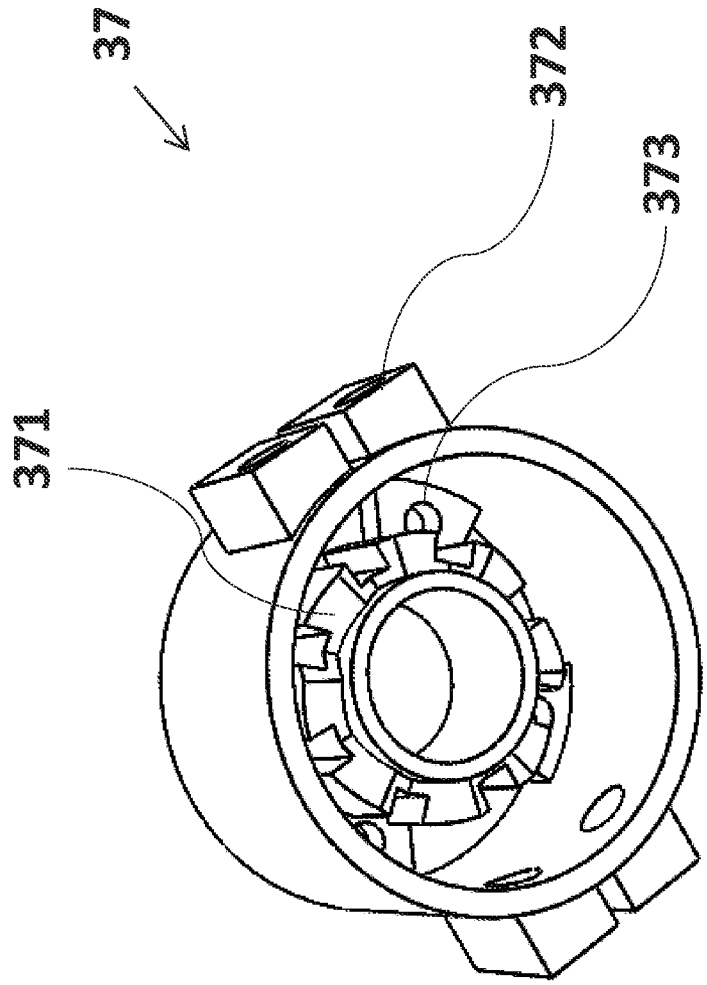
FIG. 14 depicts the top cog-wheel part (37).

The top cog-wheel part (37) as showed in FIG. 14 includes 8 sloping pushing teeth (371) but it can have more or less, 4 axis holes (372) and 4 holes (373) oriented for the push button handles bosses but it can have more or less. The top cog-wheel is inserted to the push button handle (38) through its snap (382) after being connected (372) axially to the lever bodies center rods (362).

Figure 15:
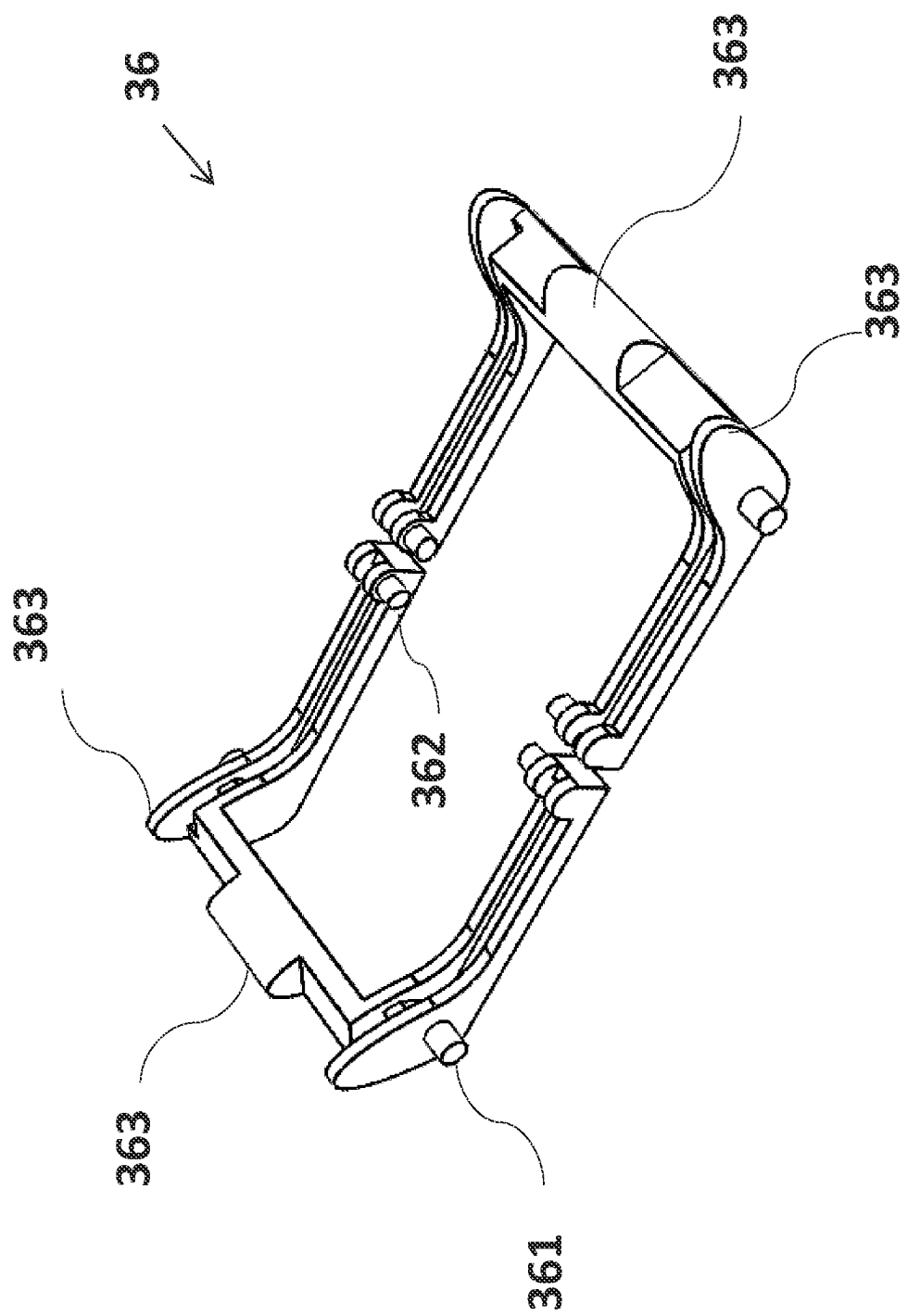
FIG. 15 depicts the 2 lever bodies (36).

The 2 lever bodies (36) as showed in FIG. 15 includes two center rods for each body (362) for axially connecting the each lever body 36 to the top cog-wheel part-oriented holes (372) and two edge rods (361) for each body (361) for axially connecting the body 36 to the walls (321) of the top part (32).

Figure 16:
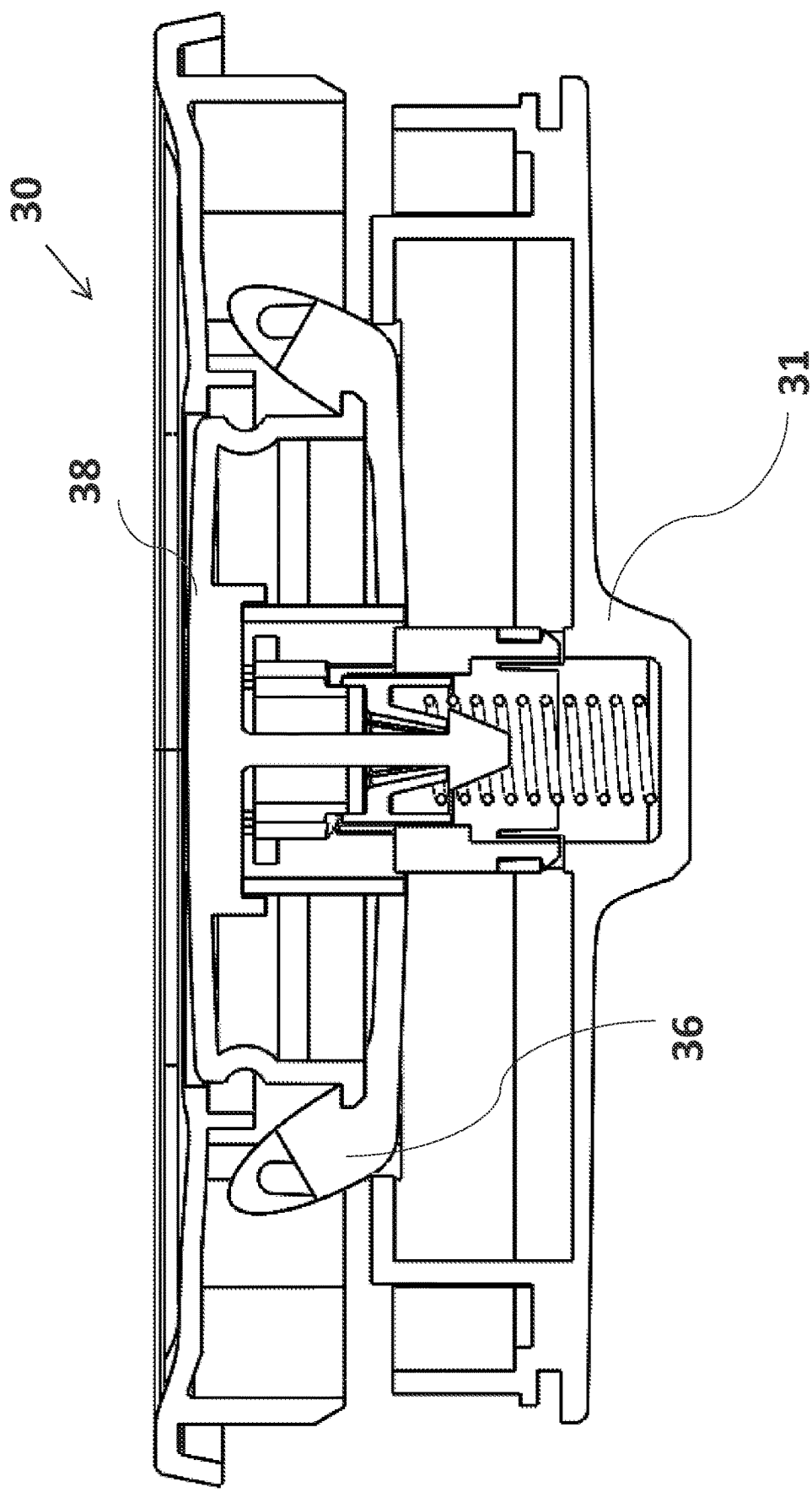
FIG. 16 depicts a cut view of the entire lid (30) assembly, step 1.

FIG. 16 depicts a cut view of the lid (30) when assembling its entire parts together—step 1 (assembly 1 and assembly 2). In order to assemble the entire lid the push button (38) is pushed hard downward, making the 2 lever bodies (36) pressed upward.

Figure 17:
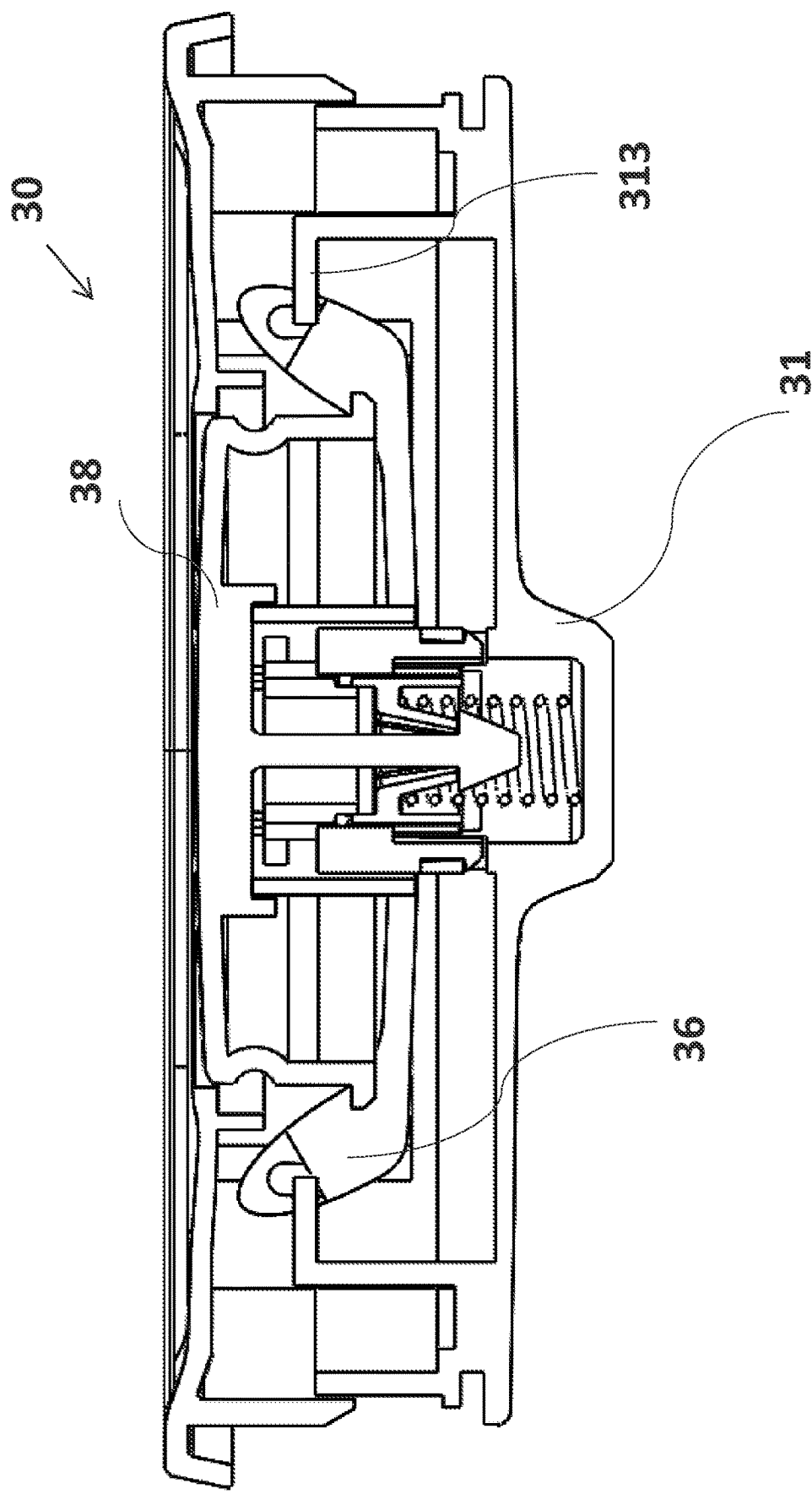
FIG. 17 depicts a cut view of the entire lid (30) assembly, step 2.

FIG. 17 depicts a cut view of the lid (30) when assembling its entire parts together—step 2 (assembly 1 and assembly 2). While the push button (38) is being pushed hard downward, and the 2 lever bodies (36) are being pressed upward, the 2 lever bodies (36) are pressing sideways the oriented walls (313) of the bottom part (31).

Figure 18:
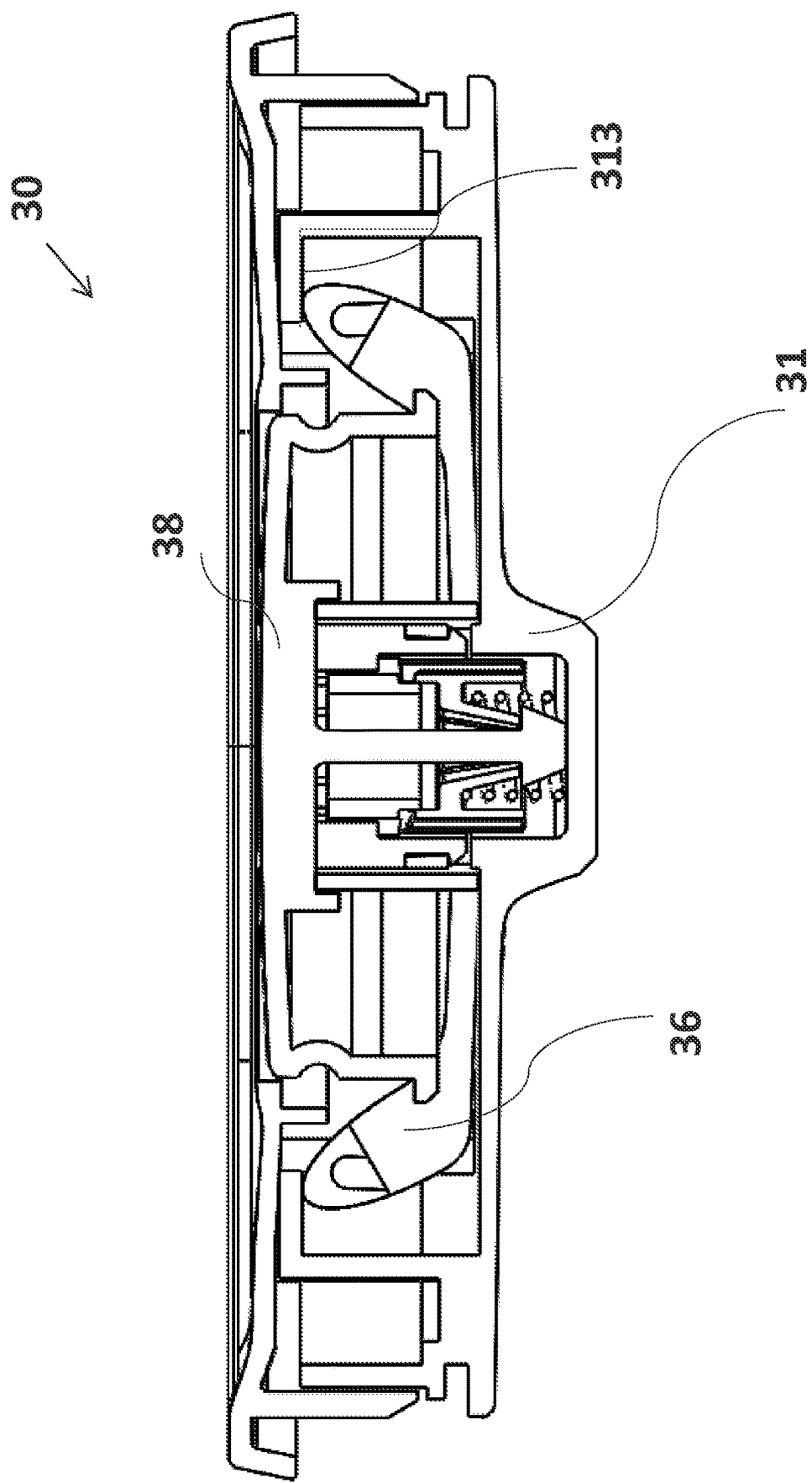
FIG. 18 depicts a cut view of the entire lid (30) assembly, step 3.
Figure 19A:
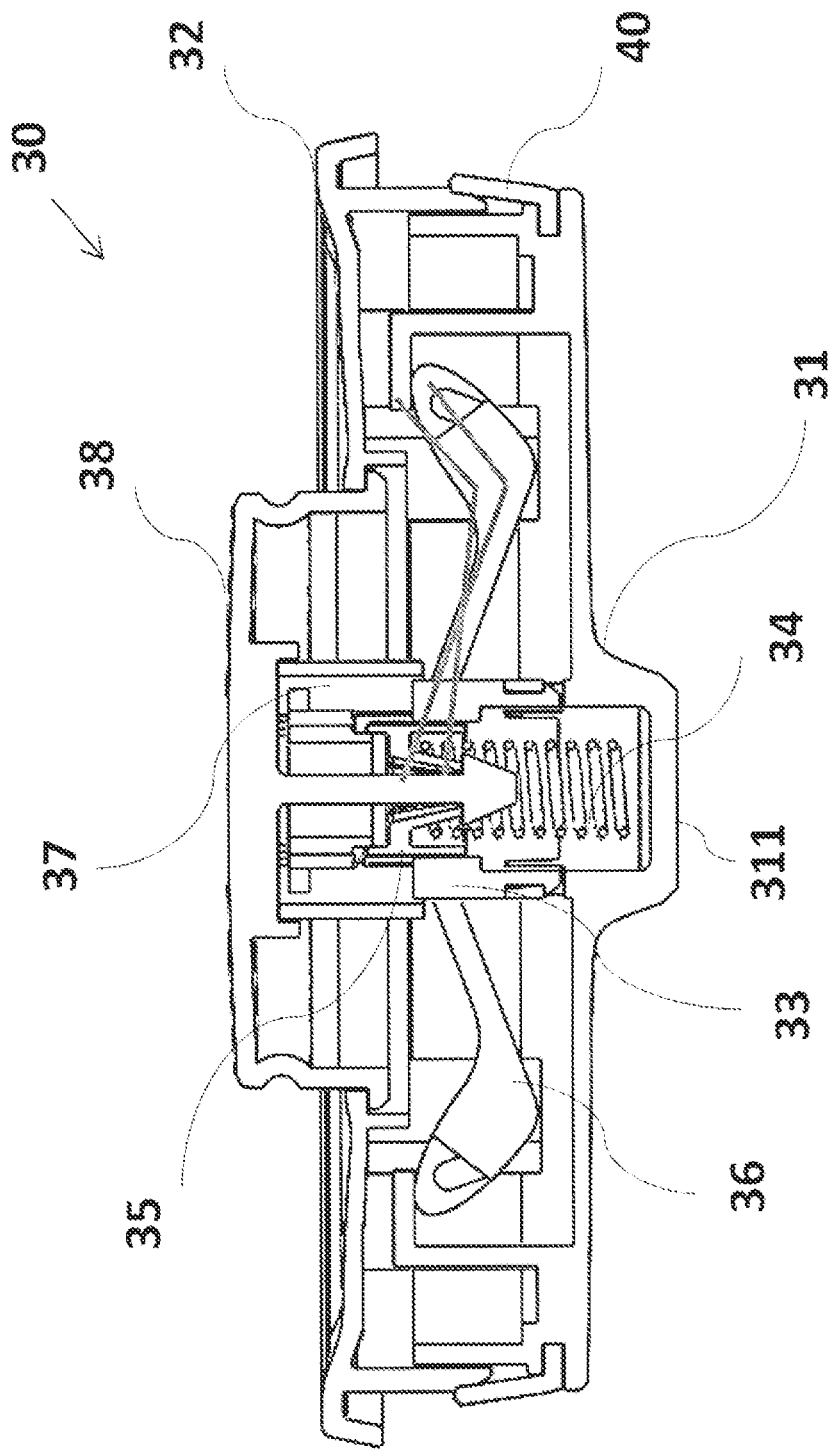
FIGS. 19A and 19B depict the lid in the retracted open position.
Figure 19B:
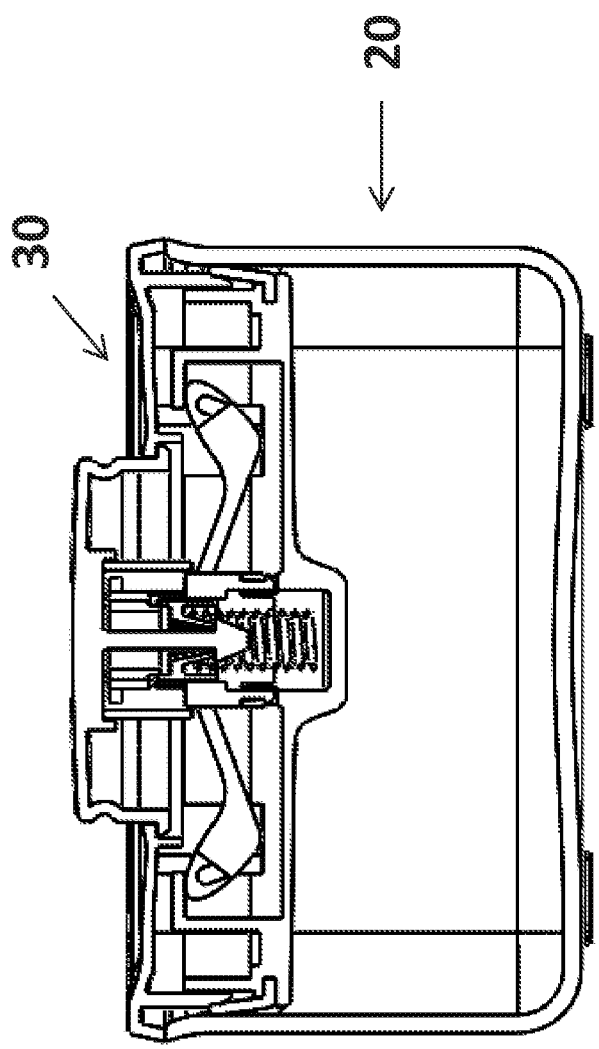
Figure 20A:
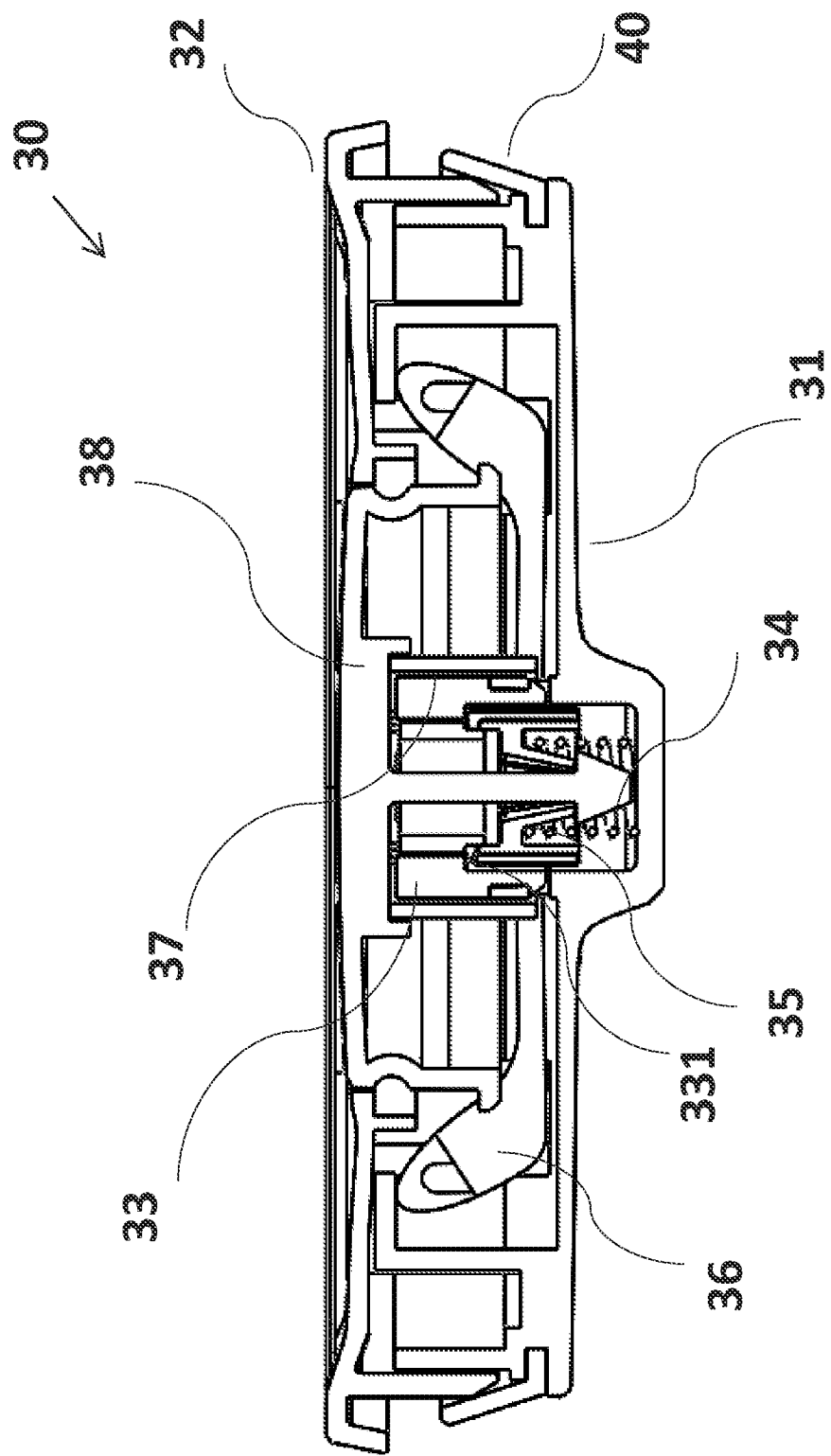
FIGS. 20A and 20B depict the lid in the extended closed position.
Figure 20B:
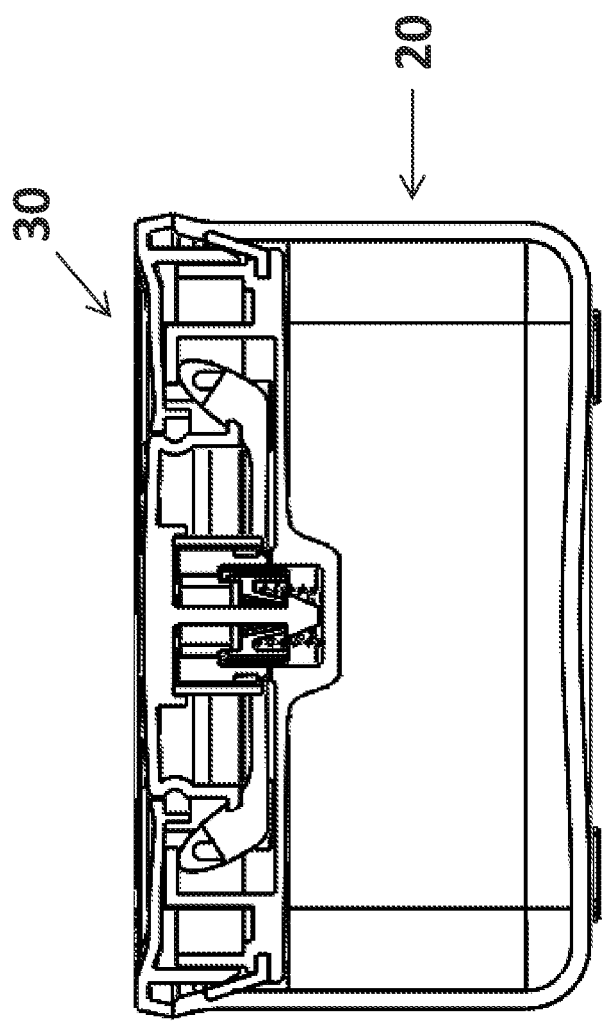

FIG. 18 depicts a cut view of the lid (30) when assembling its entire parts together—step 3 (assembly 1 and assembly 2). while the push button (38) is being pushed hard downward, and the 2 lever bodies (36) are being pressed upward, assembly 1 is inserted to assembly 2, the 2 lever bodies (36) passed through the bottom part's (31) oriented walls (313) and now are locked in those walls. The lid is now assembled.

FIGS. 19A, 19B, 20A and 20B depict a view of the lid (30) when it is in a retracted close position or in an extended open position. Assembly 1 is connected to assembly 2. The sloping teeth (351) of the bottom cog-wheel body (35) are combined with the sloping pushing teeth (371) of the top cog-wheel part (37). In the drawings that are attached to the present application the top cog-wheel part (37) and the bottom cog-wheel part (35) includes 8 sloping pushing teeth (371 & 351) but it can have more or less.

The stopping members (331) of the snap part (33) together with the sloping teeth (351) of the bottom cog-wheel body (35), the spring (34) and the sloping pushing teeth (371) of the top cog-wheel part (37) connected to the push button (38) serve in fact as a retract extend mechanism that works in general as the known retractable ballpoint pen mechanism. In action, the bottom cog-wheel body (35) rotates and slides up and down, the top cog-wheel part (37) with the sloping pushing teeth (371) does not rotate but only slides up and down and serves as a plunger, making the 2 lever bodies (36) push and release the bottom part (31) making it also move up and down and change the pressure on the seal part (40) which is being pressured and seals the box or is being released and makes the box open.

The way of assembling the parts of the lid (30) together with the circular seal (40): Assembly 1: The snap part (33) is being snaped (332) to the bottom part-oriented holes (312) and the spring (34) is to be inserted inside the base indentation (311) of the bottom part (31).

Assembly 2: The 2 lever bodies axis (362) is to be inserted to the oriented holes (372) of the top cog-wheel part (37) then they are both to be inserted to the top push button handle snap (382), then the bottom cog-wheel part (35) is to be inserted to the push button handle snap (382) so that the sloping pushing teeth (371) are touching the sloping teeth (351) of the bottom cog-wheel part (35). Next the push button handle (38) is to be inserted to the top part's (32) of the hole from beneath and the 2 lever bodies axis (361) is to be inserted to the top part's-oriented walls (321).

Assembling the entire lid (connecting assembly 1 & 2 together) will happen by pushing hard on the push button handle (38) making the 2 lever bodies (36) lift and then the bottom cog-wheel (35) can be inserted through the stopping members (331) of the snap part (33), the 2 lever bodies (36) are pressing the bottom part's (31) oriented walls (313) sideways and slid down till they are locked within those walls. Once inserted, the pressure is to be released from the top button handle (38) and the entire lid is connected. The top part and the bottom part may include means that enable to connect them together in a way that enables a relative movement up and down between them. After that, assembling the circular seal (40) around the lid (30). The bottom cog-wheel part (35) is connected to the top cog-wheel part (37) in a way that enables a rotational movement between them but not a relative vertical movement.

Retracted close position and extended open position of the lid (30): When the slopping teeth (351) of the bottom cog-wheel part (35) are under the stopping members (331) of the snap part (33) as illustrated for example in the drawings, then the bottom part (31) is tight upward to the top part (32) due to the fact that the bottom cog-wheel part (35) is 'locked' under the stopping members (331) making the 2 lever bodies (36) push upward the bottom part (31). The seal (40) then is being pressured against the container (20) as illustrated in the drawings, and this is the retracted close position of the lid (the box is closed and sealed). When the slopping teeth (351) of the bottom cog-wheel part (35) are not under the stopping members (331) of the snap part (33) as illustrated for example in the drawings, then the bottom part (31) is released downward away from the top part (32) due to the fact that the bottom cog-wheel part (35) is no longer 'locked' under the stopping members (331) and so the 2 lever bodies (36) pressure is released, then the circular seal (40) is being released as well and this is the extended open position of the lid (the box can be opened).

Whenever the user pushes down the push button handle (38) these positions are changed. For example, when the lid is in the extended open position and the user pushes down the push button handle (38) then the top cog-wheel part (37) push down the spring and the bottom cog-wheel part (35) makes one rotational step so that the slopping teeth (351) are now under the stopping members (331) and the lid is now come to the retracted close position, and so on.

The way that parts 33 and 34 are assembled and connected together to part 31 is explained above and the same to parts 38, 37, 36 and 35 as they are assembled and connected together and to part 32. We would like to emphasize that the edges 363 of the two lever bodies 36 are axially connected by the edges rods 361 with the walls 321 of the top part 32 and the center rods 362 of the bodies 36 are axially connected to the holes 372 of the top cog-wheel. The edges 363 of the bodies 36 are locked under the oriented walls 313 of the bottom part 31. In this way, the bodies 36 disable the separations of the top part 32 from the bottom part 31 due to the fact the their centers are connected to part 37 (and indirectly to the top part) and their edges are locked under part 313 of the bottom part 31, preventing the top part to be pulled out. And in addition to that, when the centers of the bodies 36 are pushed down (when pressing on the button 38 and the part 37, then their edges 363 push up the walls 313 and by that pushing up the bottom part 31 toward the top part to the closed position.

What I claim is:
1. A storage box (10) that comprises; a container (20) that is designed to contain materials, a lid (30) that is designed to cover a peripheral lip of the container, and a quadrilateral seal (40) that is designed to seal the lid (30);
    wherein the lid (30) includes a bottom (31), a top (32), a bottom cog-wheel (35) with sloping teeth (351), a spring (34), a snap (33) with stopping members (331), two lever bodies (36) with two edges (363), a top cog-wheel (37) with sloping pushing teeth (371) and a push button (38);
    wherein the top (32) is assembled on the push button (38), the top cog-wheel (37), the bottom cog-wheel (35), and on the two lever bodies (36), in such a way that four edge rods (361) of the two lever bodies (36) are axially connected to four walls (321) at the top (32), and four center rods (362) of the two lever bodies (36) are axially connected to four holes (372) at the top cog-wheel (37):
    wherein the bottom (31) includes two oriented walls (313), an indent (311) that is designed to contain the spring (34), wherein said indent (311) includes oriented holes (312) to which the snap (33) is designed to be attached:
    wherein the top (32) together with the push button, the top and bottom cog-wheels, and the two lever bodies are designed to be assembled to the bottom by pressing the top on the bottom that causes the two edges (363) of the two lever bodies (36) to push aside the two oriented walls (313) of the bottom (31), to slide under said two oriented walls (313) and to be positioned and locked under said two oriented walls (313) of the bottom (31);

wherein said two edges (363) that are locked under said oriented walls (313) are designed to prevent the top (32) to be pulled out from the bottom. (31);

wherein when the top (32) is connected to the bottom (31) the snap (33) is connected to the oriented holes (312) of the bottom (32) and the spring (34) is positioned in the indent (311);

wherein the bottom cog-wheel (35) is connected to the top cog-wheel (37) in a way that enables a rotational movement between them and disable a relative vertical movement; and wherein the lid (30) is designed to be in a retracted close position or in an extended open position, said positions can be changed whenever a user push down the push button (38).

\* \* \* \* \*